United States Patent
Heine et al.

(10) Patent No.: US 6,310,967 B1
(45) Date of Patent: Oct. 30, 2001

(54) NORMAL AND ABNORMAL TISSUE IDENTIFICATION SYSTEM AND METHOD FOR MEDICAL IMAGES SUCH AS DIGITAL MAMMOGRAMS

(75) Inventors: John J. Heine, New Port Richey, FL (US); Laurence P. Clarke, Temple Terrace, FL (US); Stanley R. Deans, Tampa, FL (US); Richard Paul Stauduhar, Kailua Kona, HI (US); David Kent Cullers, Menlo Park, CA (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 09/069,473

(22) Filed: Apr. 29, 1998

(51) Int. Cl.$^7$ ........................................ G06K 9/00
(52) U.S. Cl. ........................................... 382/128
(58) Field of Search ........................ 382/128, 132, 382/270, 298, 299, 302, 199; 378/37, 62; 128/922; 358/261.3; 706/20; 250/369

(56) References Cited

U.S. PATENT DOCUMENTS

| | | | |
|---|---|---|---|
| 4,910,786 | * 3/1990 | Eichel ................................ | 382/199 |
| 5,014,134 | * 5/1991 | Lawton et al. .................... | 358/261.3 |
| 5,315,670 | * 5/1994 | Shapiro .............................. | 382/240 |
| 5,465,321 | * 11/1995 | Smyth ................................ | 706/20 |
| 5,572,565 | * 11/1996 | Abdel-Mottaleb ................. | 378/37 |
| 5,576,548 | * 11/1996 | Clark et al. ....................... | 250/369 |
| 5,619,998 | * 4/1997 | Abdel-Malek et al. ............ | 600/437 |
| 5,740,268 | * 4/1998 | Nishikawa et al. ............... | 382/132 |
| 5,757,309 | * 5/1998 | Brooks et al. .................... | 342/90 |
| 5,835,619 | * 11/1998 | Morimoto et al. ................ | 382/132 |
| 5,867,602 | * 2/1999 | Zandi et al. ...................... | 382/248 |
| 5,987,094 | * 11/1999 | Clark et al. ....................... | 378/62 |
| 6,058,322 | * 5/2000 | Nishikawa et al. ............... | 600/408 |

OTHER PUBLICATIONS

"Markov Random field for tumor detection in digital mammography" by Li et al., IEEE transaction on medical imaging, vol. 14, No. 3, Sep. 1995.*

"A theory for multiresolution signal decomposition: The wavelet representation" By Stephen G. Mallat, IEEE transactions on pattern and analysis and machine intelligence, vol. 11, No. 7, 1989.*

(List continued on next page.)

Primary Examiner—Andrew W. Johns
Assistant Examiner—Shervin Nakhjavan
(74) Attorney, Agent, or Firm—Allen, Dyer, Doppelt, Milbrath & Gilchrist, P.A.

(57) ABSTRACT

A system and method for analyzing a medical image to determine whether an abnormality is present, for example, in digital mammograms, includes the application of a wavelet expansion to a raw image to obtain subspace images of varying resolution. At least one subspace image is selected that has a resolution commensurate with a desired predetermined detection resolution range. A functional form of a probability distribution function is determined for each selected subspace image, and an optimal statistical normal image region test is determined for each selected subspace image. A threshold level for the probability distribution function is established from the optimal statistical normal image region test for each selected subspace image. A region size comprising at least one sector is defined, and an output image is created that includes a combination of all regions for each selected subspace image. Each region has a first value when the region intensity level is above the threshold and a second value when the region intensity level is below the threshold. This permits the localization of a potential abnormality within the image.

25 Claims, 30 Drawing Sheets

OTHER PUBLICATIONS

"Image coding using wavelet transform" By Antonini et al., IEEE transactions on image processing, vol. 1, No. 2, Apr. 1992.*

"Segmentation of microcalcifications in mammograms" By Dengler et al., IEEE transactions on medical imaging, vol. 12, No. 4, Dec. 1993.*

"Tree–structured nonlinear filters in digital mammography" By Qian et al., IEEE transactions on medical imaging, vol. 13, No. 1, Mar. 1994.*

"Multiresolution statistical analysis of high–resolution digital mammograms" By Heine et al., IEEE transactions on medical imaging, vol. 16, No. 5, Oct. 1997.*

* cited by examiner

FIG. 2a.
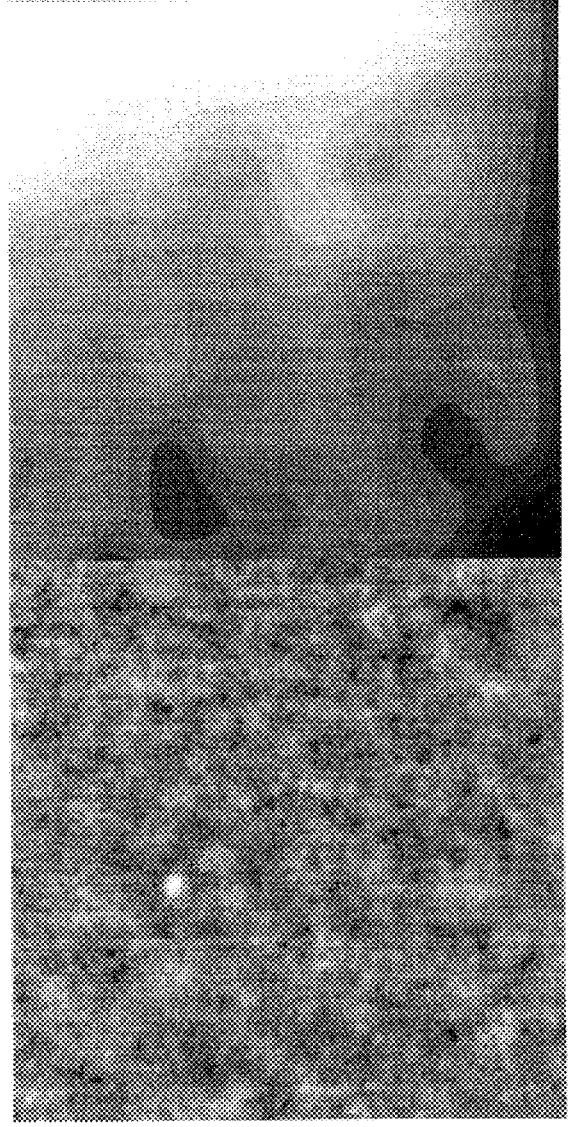
FIG. 2b.
FIG. 2c.

NORMAL AND ABNORMAL TISSUE IDENTIFICATION SYSTEM AND METHOD FOR MEDICAL IMAGES SUCH AS DIGITAL MAMMOGRAMS

GOVERNMENT SUPPORT

This invention was supported in part by the National Aeronautics and Space Administration (NASA) Ames Research Center, under Grant NCC 2-881.

BACKGROUND OF THE INVENTION

1. Field of the Invention

The present invention relates to systems and methods for analyzing medical images, and, more particularly, to systems and methods for analyzing digital mammograms.

2. Description of Related Art

Many computer-aided diagnosis (CAD) schemes have been devised for mammographic image analysis [1–27]. A general review of digital radiography has been given by Doi et al. [1]. Many of these methods are based on multiresolution techniques.

Work related to the use of various multiresolution methods for investigating mammograms includes Refs. 3, 11, 12, 19, 23, and 26. Dengler et al. [11] use a difference of two Gaussians for the detection filter, and the final detection is based on a global threshold. Valatx et al. [12] generate a smooth approximation of the image with a β-spline expansion and apply a mixed distribution based local thresholding technique to both the raw and approximated image; the output image is formed by subtracting the two thresholded images. A calcification segmentation method is developed by Qian et al. [3] using two-channel and multichannel wavelet transforms [19], based on subband selection and a rescaling (thresholding) technique for feature detection [24]. Strickland and Hann [23] apply the wavelet transform at full resolution (no downsampling) and detect independently in two sets (HH and LH+HL) of three full resolution subband images. The detection results are combined, further processed, and the inverse wavelet transform is implemented. De Vore et al. [26] implement the standard wavelet transform, select the important subbands, and invert the transform after wavelet coefficient suppression. The resulting image is empirically thresholded in order to remove the remaining background information.

Various statistical approaches have been used to study mammograms [12–14, 18,21,23,27]. Wavelet domain coefficient probability modeling has also been utilized in other areas of research: selecting optimized coding methods [28, 29], Gauss-Markov field representation [30–32], and texture identification [32].

It is known that film grain noise in mammograms is signal dependent [33, 34]. Typically, the accepted noise field for radiographs results from three independent components: (1) spatial fluctuations in the number of x-ray quanta absorbed in the screen; (2) spatial fluctuations in the screen absorption associated with random structural inhomogeneities in the phosphor coating; and (3) spatial fluctuations in film sensitivity due to the silver halide random distribution per unit area in the emulsion [35]. Many CAD methods have found it essential to carefully treat the image noise with a preprocessing step [3, 15, 22, 27, 36].

SUMMARY OF THE INVENTION

It is therefore an object of the present invention to provide a system and method for identifying normal and abnormal tissue in medical images such as mammograms.

It is an additional object to provide such a system and method that permit significant time savings in reading clinically normal mammograms.

It is a further object to provide such a system and method for providing a second opinion strategy.

It is another object to provide such a system and method having sufficient performance to detect a predetermined portion of the normal images with a low probability of false negatives.

It is yet an additional object to provide such a system and method for detecting calcifications.

These objects and others are attained by the present invention, a system and method for identifying normal tissue in medical images. Here the term normal is intended to define an image that does not contain a suspicious area, an image aberration, or small image medium defects. As radiologists spends an enormous amount of time investigating images lacking abnormalities, the invention can save a great deal of valuable time. This system and method may also be considered a second-opinion strategy, since the image can be declared "normal" by the detection system and method, and then reviewed by a radiologist, and thus the image has been analyzed twice.

In a preferred embodiment, the invention addresses the detection of microcalcifications in mammograms, with a performance of detecting 40–50% of the normal images with a low probability of false negatives.

The invention comprises the use of a multiresolution statistical model for normal tissue. This model is then used to make comparisons with local image regions. If a small region deviates significantly from the global model, it is flagged as potentially suspicious; if a region is in agreement, it can be discarded. The systematic identification of abnormal regions can be regarded as a detection algorithm that can be tested and evaluated using a standard database. If no suspicious regions are located, an image lacking any pathology can be identified by the detection process.

A fundamental distinction exists between the techniques of the present invention and the prior art. Herein a multiresolution approach is used as a simplifying device for statistical modeling, in order to show that a multiresolution statistical analysis has the potential for simplifying what has previously been considered an intractable statistical problem. Specifically, the statistical interpretation of a raw image is very difficult, but is reasonably simple when applied separately to various resolutions of the image, after the decomposition into independent subspace images.

Specifically, the method of the present invention comprises the step of applying a wavelet expansion to a raw image. The raw image, which is typically in electronic form, comprises an array of sectors (e.g., pixels), wherein each sector has an intensity level. The wavelet expansion is for obtaining a plurality of subspace images of varying resolution.

The next step comprises selecting at least one subspace image that has a resolution commensurate with a desired predetermined detection resolution range. For example, if it is desired to examine for the presence of a neoplasm or calcification having dimensions in a particular size range, one or more subspace images are selected that encompass that size range.

Next is determined a functional form of a probability distribution function (pdf) for each selected subspace image and an optimal statistical normal image region test for each selected subspace image. There is a test statistic associated with the normal image region test that has some pdf. From this pdf a threshold level is established for the probability distribution function from the optimal statistical normal image region test for each selected subspace image. Preferably this step is accomplished with the use of a "test statistic," which will be described in the following.

Finally, an output image is created, such as in electronic and/or visualizable form. A region is defined as comprising at least one sector, typically a plurality of sectors, against which the threshold level is compared. The output image has a first value (e.g., "1") for each region when the region intensity level is above the threshold and a second value (e.g., "0") when the region intensity level is below the threshold. This image then permits the localization of a potential abnormality within the image.

Preferably, this method is taken a step further, although this is not intended as a limitation. The further step comprises determining for the presence of a plurality of above-threshold regions within a predetermined larger area. Such a plurality of above-threshold regions can be indicative of a likelihood of abnormality.

There are two distinctions between the present invention and previously reported statistical approaches, including the noise processing approach. First, the statistical analysis is applied to independent subspace images. The accepted noise components and the signal are lumped together; the aggregate is considered as a random field. Second, the focus is on the identification of statistical properties of normal tissue at multiple resolutions. This tissue provides the most abundant signal in the image, since in some medical images, such as mammograms, most of the image information, even when abnormalities are present, is associated with disease-free tissue. Regions that contain statistical aberrations that deviate from the normal model are considered as abnormal regions. This yields a multiresolution model that allows for features of interest, in the case of mammograms, calcifications, to be considered as outliers or perturbations to the global statistic of the applicable subspace image(s). This is an image domain approach that illustrates the power of taking a different view of the same information. An alternate method is to work entirely in the wavelet domain.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
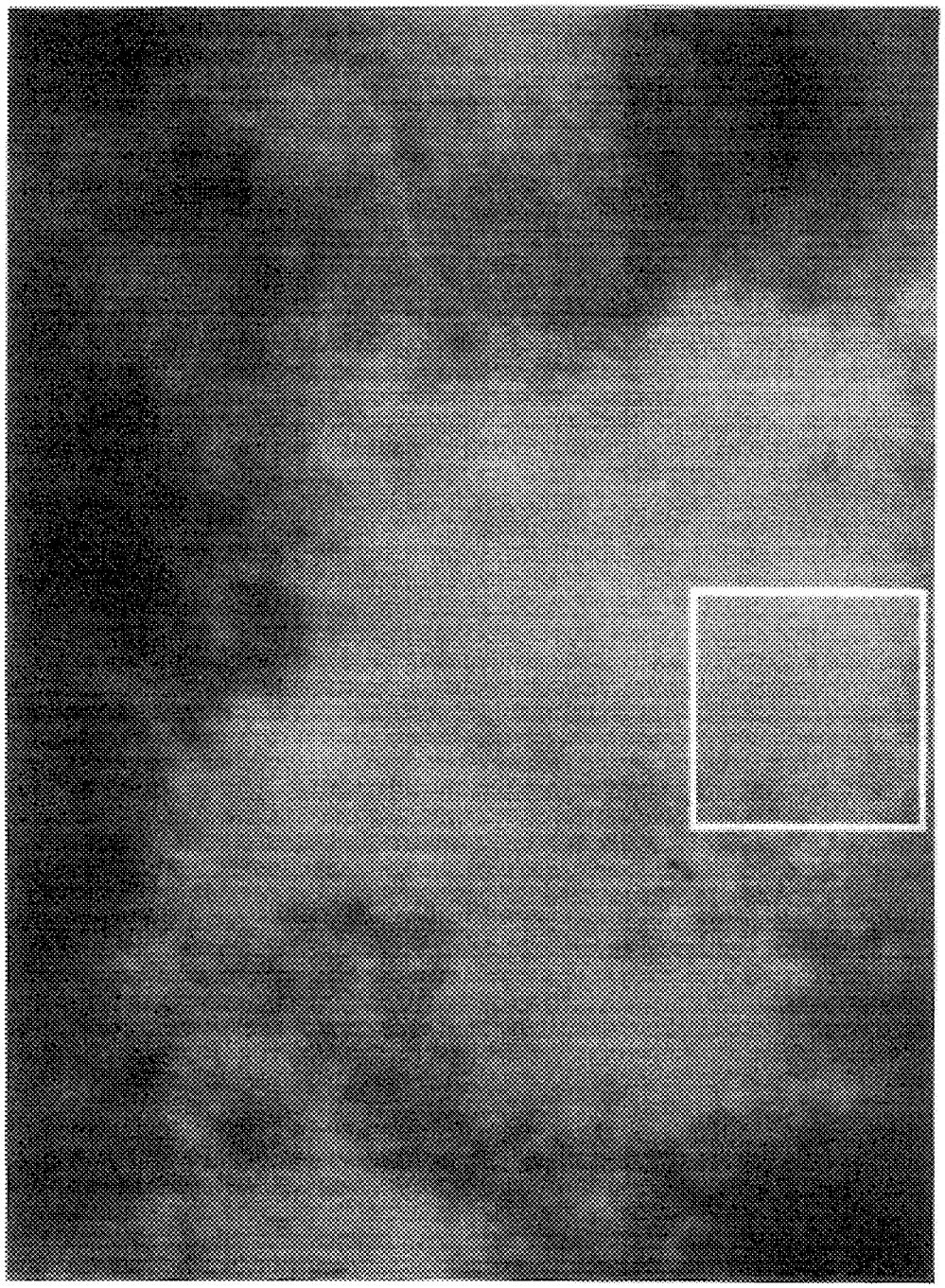
FIG. 1 is a raw image, size 1024×2048, with 35-$\mu$m digital resolution, rescaled for viewing. The ROI containing a benign calcification is outlined.

A description of the preferred embodiments of the present invention will now be presented with reference to FIGS. 1–23.

I. Image Information

The images under investigation are film mammograms, in this particular embodiment digitized at 35-$\mu$m-per-pixel resolution with 12-b precision, using a DuPont NDT Scan II Film Digitizer, although this is not intended as a limitation. The use of large image sections avoids having the background signal influence the model; this is preferable for reliable statistical analysis. The term "image" refers to these large sections. Any section is approximately the largest rectangle with power-of-two dimensions that can be inscribed within the breast boundary. These are manually excised in a particular embodiment. The larger images correspond roughly to sections 7×7 cm, and the smaller images correspond to 7×3.5 cm. Whole mammograms have also been tested.

In an alternate embodiment (see FIG. 17), the tissue region can be electronically excised by assuming that two noise fields are present in the image: the tissue field that contains all the signal information within the tissue region and the off-tissue noise field that consists of two components, a generally random noise field and bright artifacts or anomalous regions. First the tissue region is separated from the random noise field, and then the largest remaining contiguous region containing signal is assumed to be the tissue region. Everything but this region is set to zero. A complete discussion of this technique is found in Ref. 51.

The choice to work with high-resolution and high-dynamic-range images is prudent for two main reasons: (1) 35-$\mu$m digital resolution closely matches the Nyquist sampling rate for the file used, and (2) a higher bit rate image more closely resembles the intensity distribution of the analog image. (If we err in the needed bit rate, it is better to err on the side of too much rather than too little.)

A database utilized in the present investigation contains over 100 mammograms with combinations of normals (no pathologies) and abnormals (images with biopsy-proven calcification clusters), all with varying parenchymal densities, as described by Kallergi et al. [37]. Images from this database were used by Zheng et al. [25] at lower resolution (images reduced to 105-$\mu$m resolution) for calcification detection. We selected 28 at random and 2 specifically. The 2 images not selected at random were deliberately picked because they contain very subtle clusters, and it is important to evaluate the detection performance with limiting cases. Of the 30 images studied, 17 are clinically abnormal and 13 are pathology free. This means that 2 of 17 ($\approx$12%) of the abnormal images in this study are difficult detection cases; this is well above the anticipated number of such cases likely to arise from a large database.

II. Wavelet Expansion and Primary Statistic

A. Multiresolution Expansion

The multiresolution approach allows for the image expansion to take the form of a sum of independent subspace images given by the identity [38]

$$f_0 = (f_0 - f_1) + (f_1 - f_2) + \ldots + (f_{j-1} - f_j) + f_j \tag{1}$$

where [39, ch. 5] the $f_1$ image is the next coarser representation of $f_0$ and $f_2$ is the next coarser representation of $f_1$. Specifically, $f_1$ is a half resolution (lower half of the original frequency spectrum) version of $f_0$ and $f_2$ is a fourth-resolution (lower fourth of the original frequency spectrum) version of $f_0$. The image that contains the difference in "information" between the successive images $f_0$ and $f_1$, is designated by $d_1 \equiv f_0 - f_1$. This pattern is continued to yield $$f_0 = d_1 + d_2 + \ldots + d_j + f_j. \tag{2}$$

The interpretation of this expression in terms of images is that the [fine detail→coarse detail] of the image is contained in terms [$d_1 \rightarrow d_j$] and $f_j$ is a smoothed (blurred) version of $f_0$. The important observation is that orthogonality of the subspaces ensures independence of the various images in the decomposition. This type of expansion and the relative frequency spectrum for each image are discussed by Daubechies [39, p. 332]. Each $d_i$ image results from three independent components or subband images in the wavelet domain related to features oriented in the horizontal, vertical, and diagonal directions [39, pp. 313–320]. The image domain approach allows for the three directional subband components of a particular image resolution to be combined and observed simultaneously.

The forward wavelet transform is performed with a separable kernel two-dimensional pyramid downsampling scheme. Each $d_j$ image is constructed from inverting the three appropriate subband wavelet domain images (horizontal, vertical, and diagonal components) of a particular decomposition level j, with upsampling [39]. The forward and reverse transforms are executed with circular (periodic) boundaries. This wavelet decomposition and reconstruction method ensures that the $d_j$ images are linearly independent (lack redundancies) and ensures the image identity sum (2) be exact. The resulting $d_j$ image contains a limited bandpass (rectangular) section of the original frequency spectrum. For this analysis we use a symmlet wavelet with 12 coefficients. This wavelet is nearly symmetric and is chosen because it roughly resembles the intensity profile of calcifications. This is supported by empirical observations and is only a general approximation. This does not imply that the symmlet functions are truly matched filters for every calcification profile, but merely indicates that this basis is probably a better choice than the Haar, D4, or other similar basis.

Figure 2D:
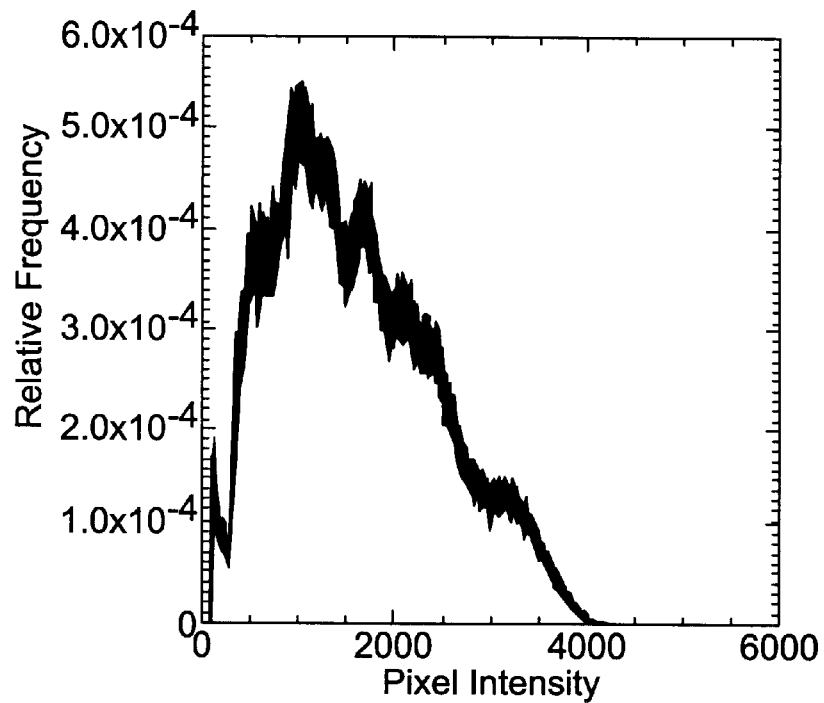
FIG. 2a The 256–256 ROI at fill resolution, magnified for viewing, and FIG. 2d the raw image histogram. The histogram is from the fill resolution 1024×2048 raw image.
FIG. 2b is the low-resolution $f_5$ ROI and FIG. 2e the associated histogram. Comparison of these two histograms reveals that the irregular multimodal structure is contained in the background, and not much discernible information is present in this image.
FIG. 2c The total image resulting from adding the five subspace images, $d_1$–$d_5$. Most of the image detail structure is contained here.
Figure 2E:
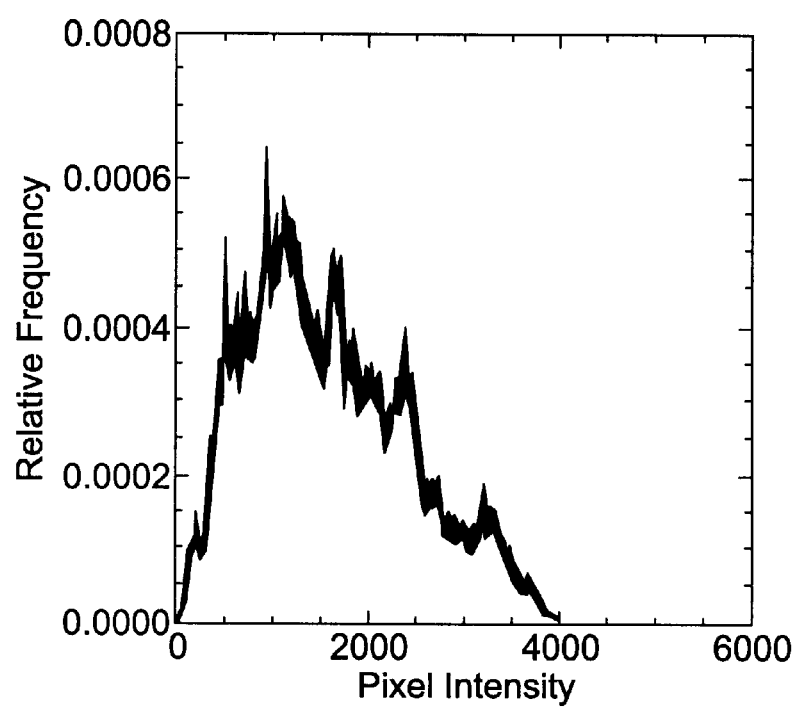
Figures 3A, 3B, 3C:
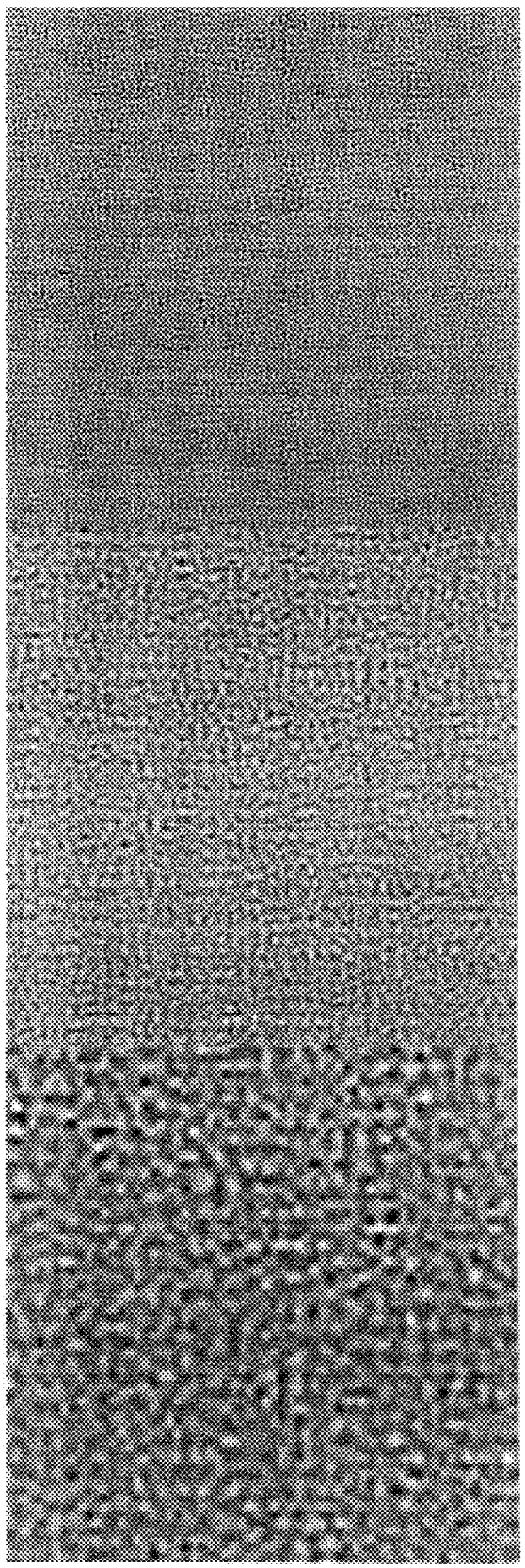
FIGS. 3a–c include the fine to coarse detail representations, $d_1$–$d_3$. The empirical histograms; of FIGS. 3f–j (solid lines) are to be compared with the estimated pdfs (diamonds). Note that the histograms represent the absolute value image distribution. Points have been skipped in the theoretical plots to avoid overlap and confusion.
Figures 3D, 3E:
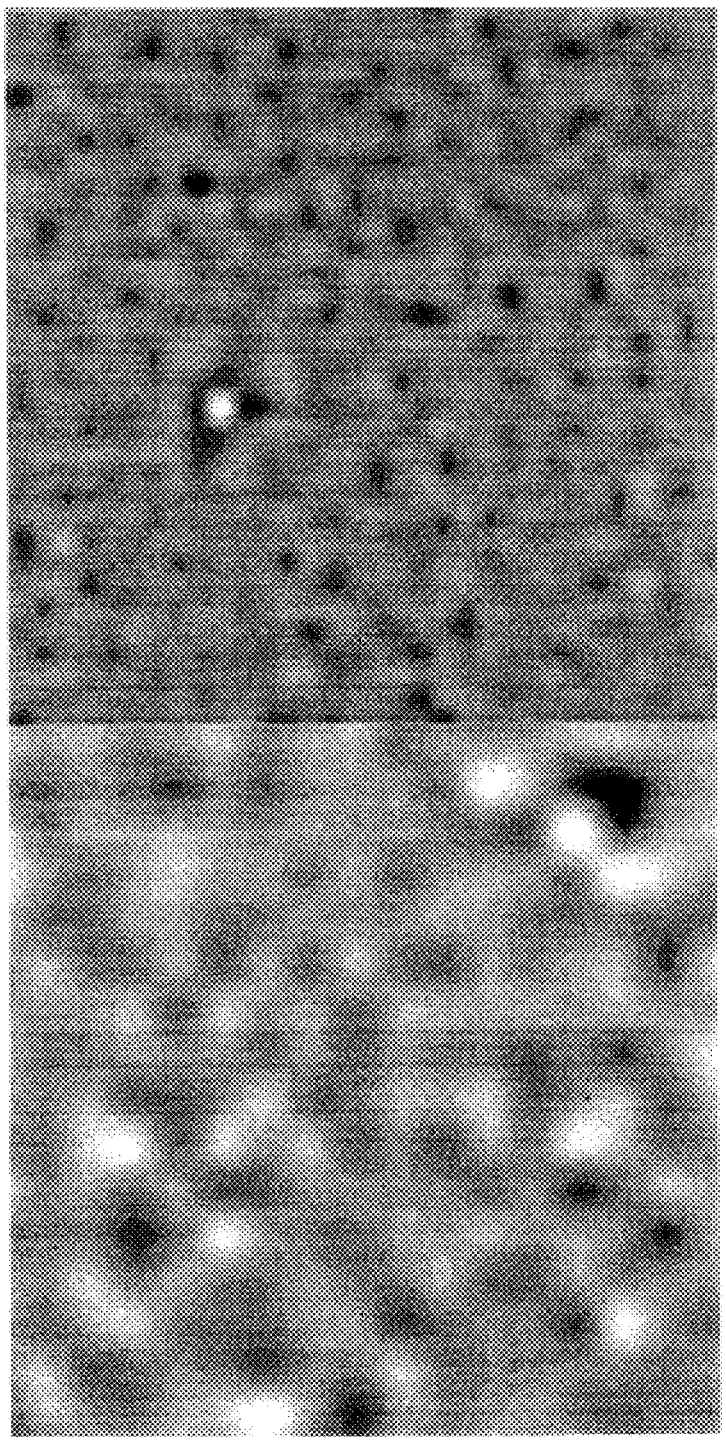
FIG. 3d–e are the fine to coarse detail representation. $d_4$ and $d_5$. The empirical histograms are to be compared with the estimated pdfs (diamonds). Note that the histograms represent the absolute value image distribution. Points have been skipped in the theoretical plots to avoid overlap and confusion. The benign calcification, noticeable in the $d_4$ subimage, may be considered as an outlier to the normal tissue model at this resolution.
Figure 3F:
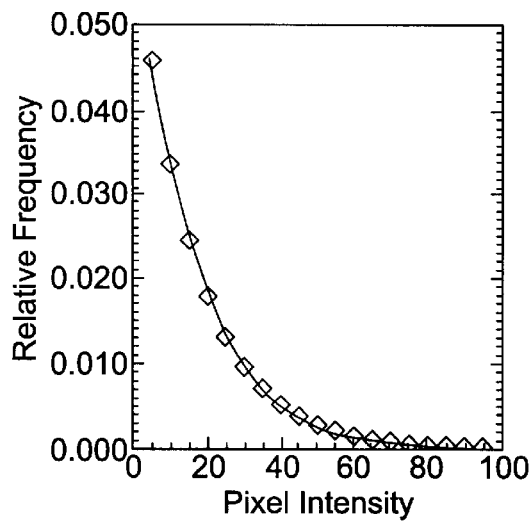
Figure 3G:
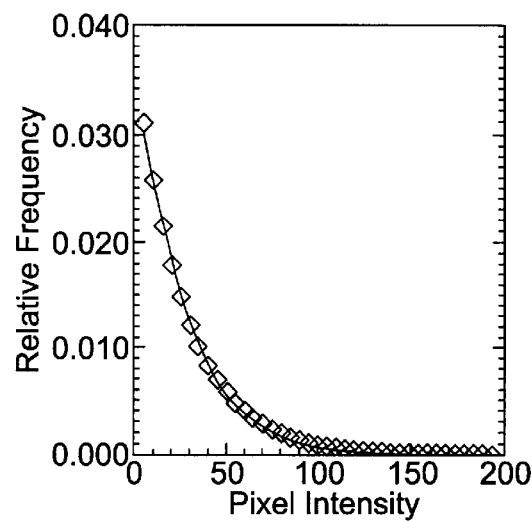
Figure 3H:
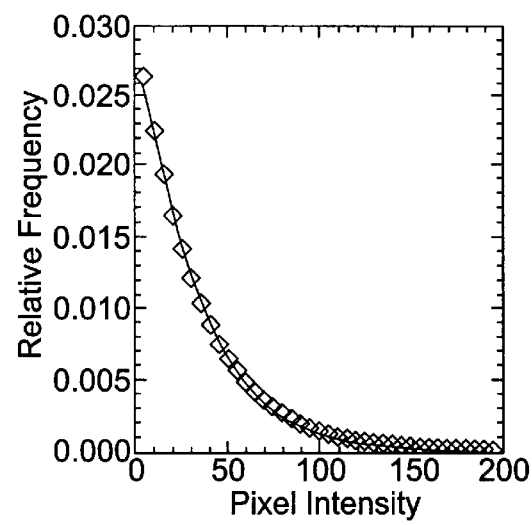
Figure 3I:
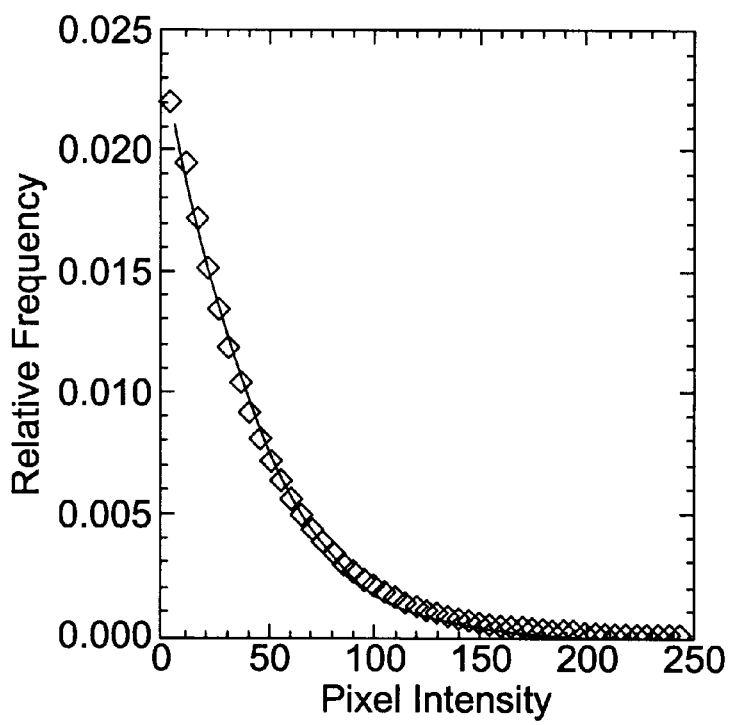
Figure 3J:
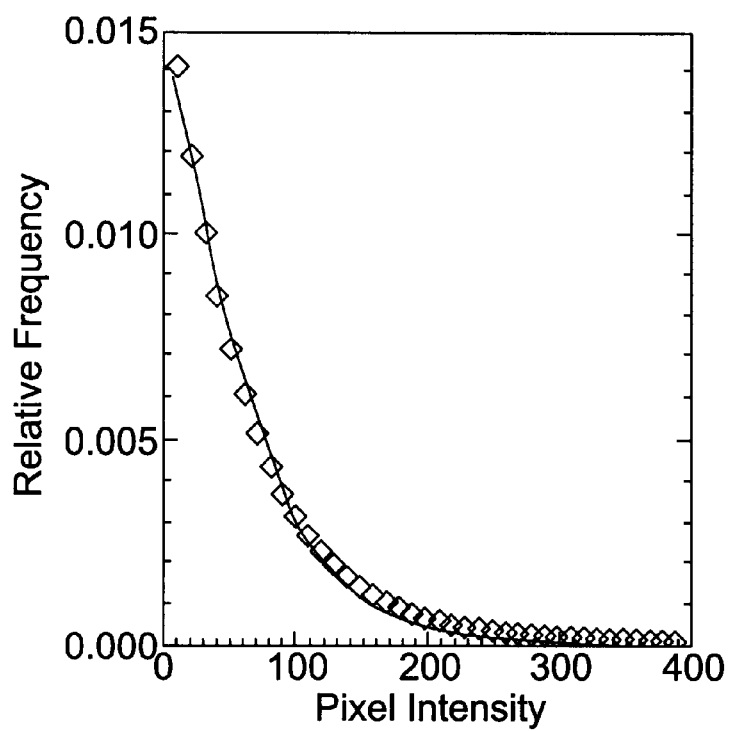

For illustration purposes, we consider an image expansion with j=5. FIG. 1 presents a scaled version of a 1024×2048 section of a mammogram with an arbitrary 256×256 region of interest (ROI) outlined. This region will be used for demonstration purposes, but the numerical analysis is performed on the entire fill section image. FIGS. 2 and 3 contain the raw ROI, the low-resolution $f_5$ component, the sum of the five detail images, and the fine to coarse detail information. Important observations stem from this decomposition include: (1) Image $f_5$ is a very blurred version of the raw image, and the image structure is hardly discernible (see FIGS. 2a and 2b), (2) the total detail image (the sum of all the detail images) contains the important detail structure of the image (compare FIG. 2a with 2c), (3) the information needed for calcification detection is contained in some of these images, mainly the $d_4$ image in this case (see FIG. 3d), and (4) the simplicity of the probability distributions for the detail images is apparent from the histograms of FIG. 3.

B. The Family of Probability Distribution Functions

1. Mammographic Applications

Figure 10:
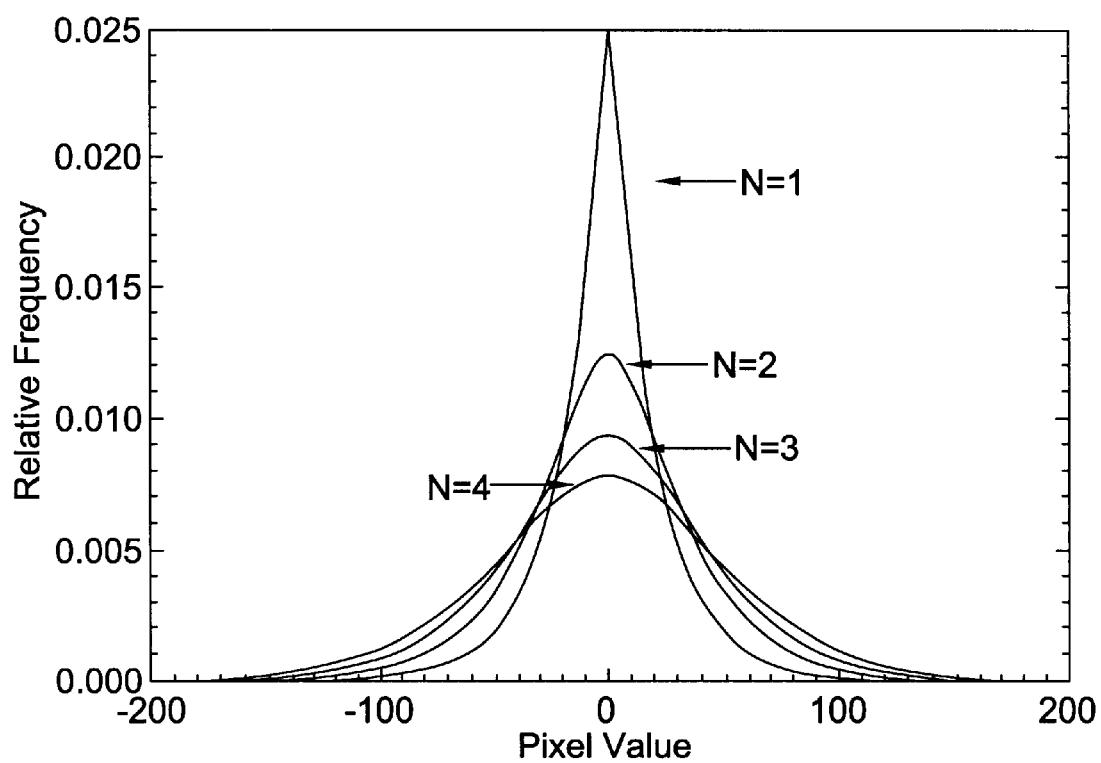
FIG. 10 shows a family of probability functions for N=1–4. Note that the curves spread out and become more bell shaped for larger N.
Figures 11A, 11B, 11C:
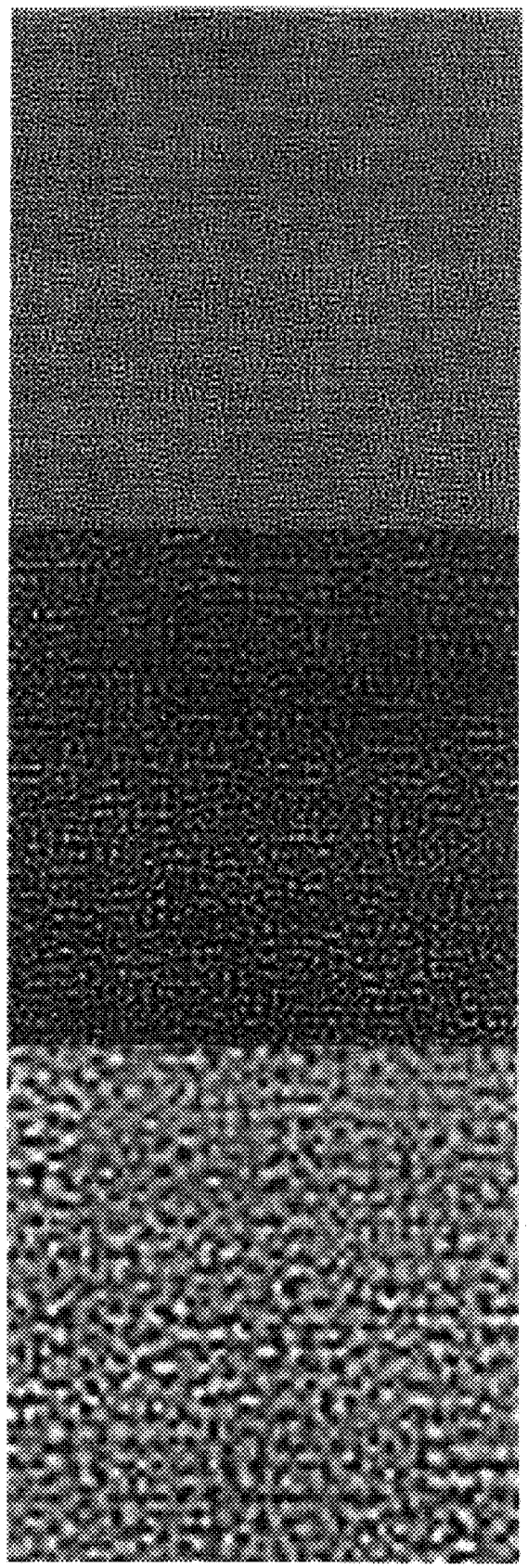
FIG. 11 is an example of a case where N=1 for the first three detail images, top to bottom, respectively. The data represent about 5×10$^6$ pixels, where the empirical histograms (solid) are to be compared with the theoretical estimate (dashed). The absolute value data are displayed.
Figure 11D:
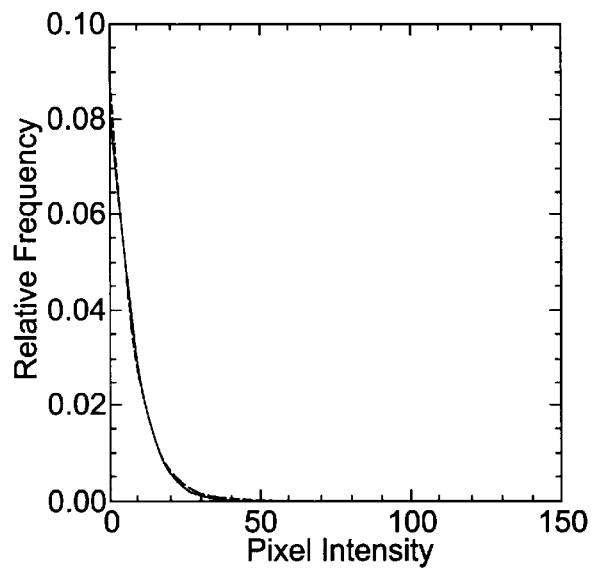
Figure 11E:
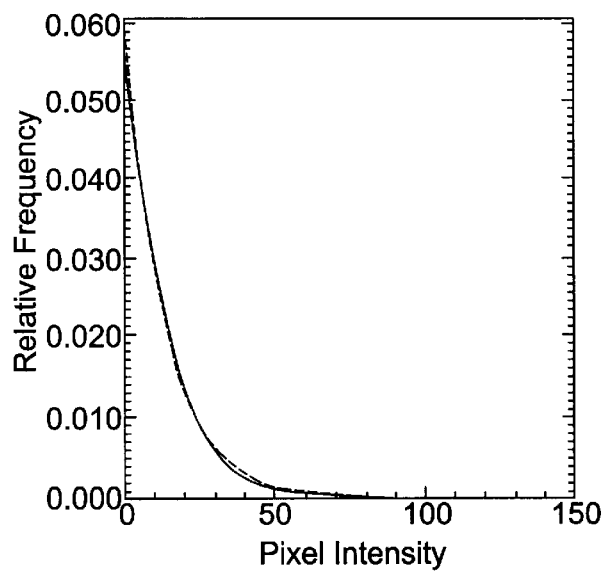
Figure 11F:
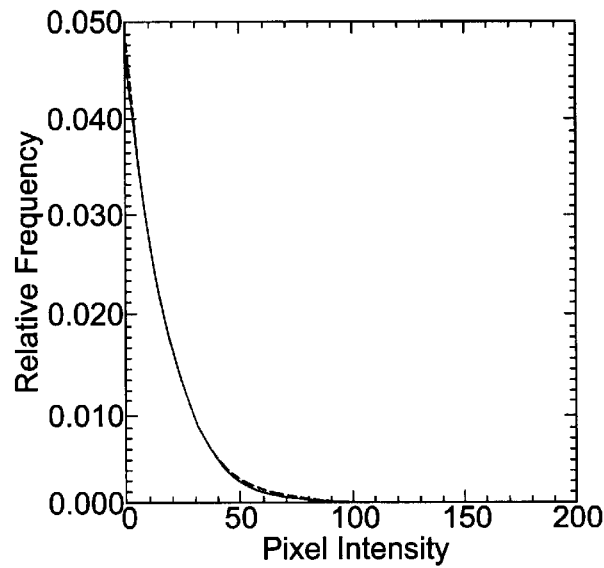
Figures 12A, 12B, 12C:
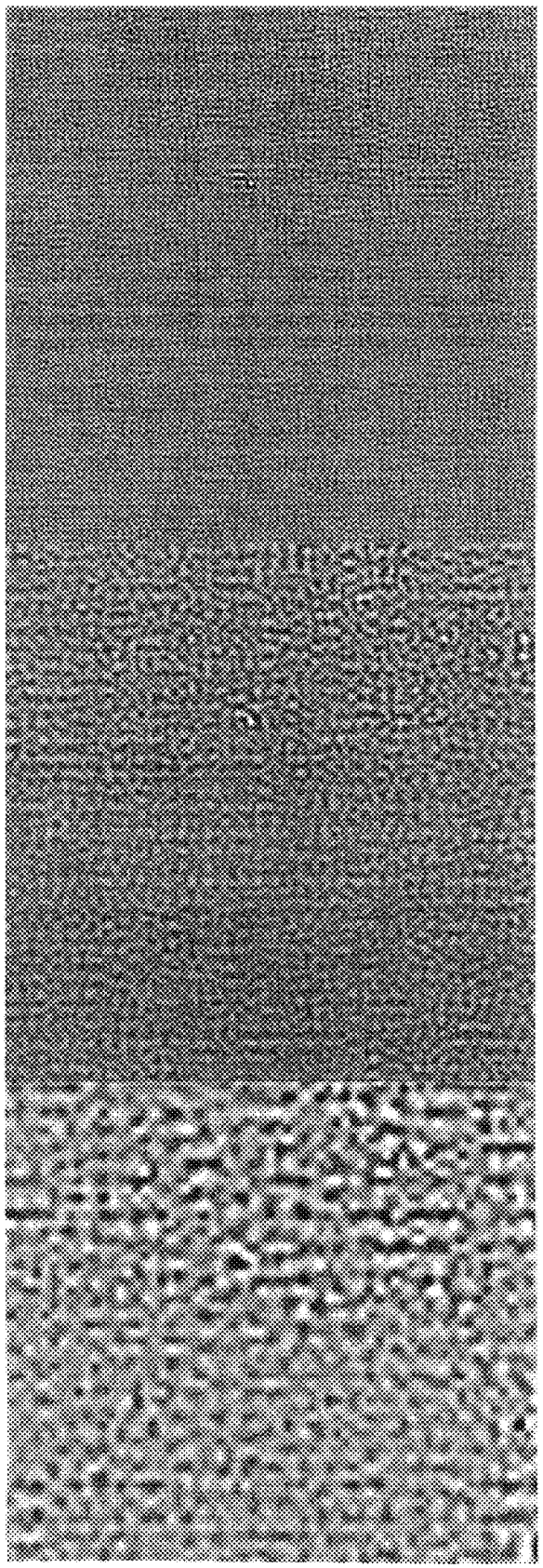
FIG. 12 is an example of a case where N=2 for the first three detail images, top to bottom, respectively. The data represent about 5×10$^6$ pixels, where the empirical histograms (solid) are to be compared with the theoretical estimate (dashed). The absolute value data are displayed.
Figure 12D:
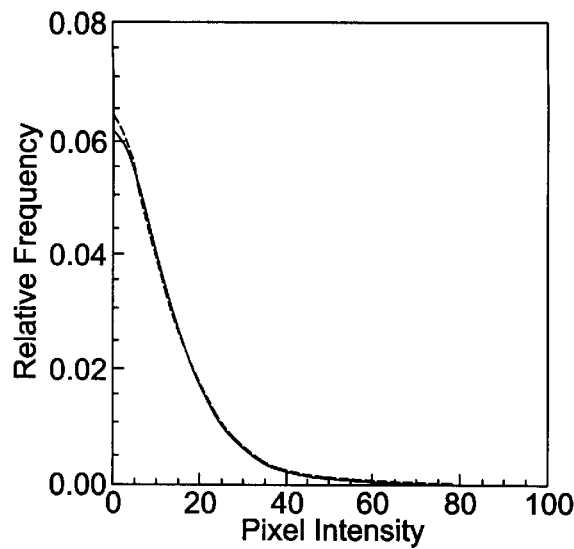
Figure 12E:
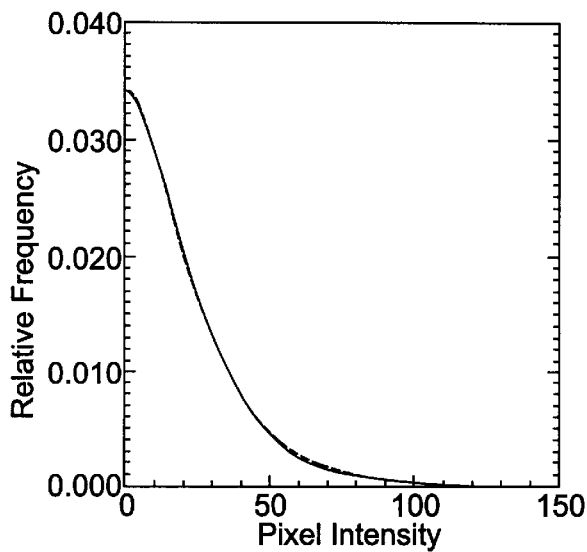
Figure 12F:
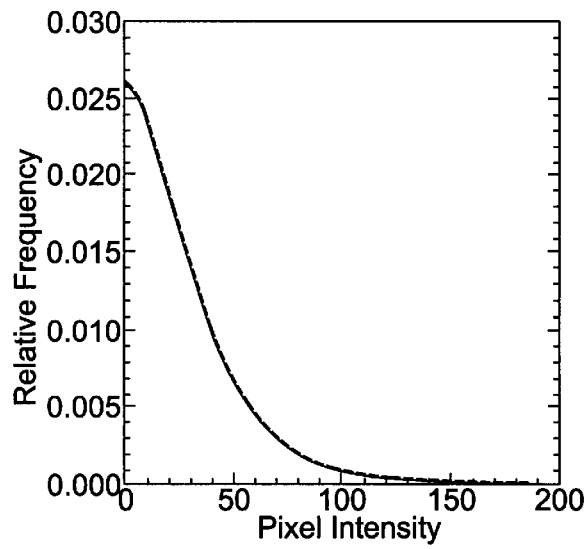
Figures 13A, 13B, 13C:
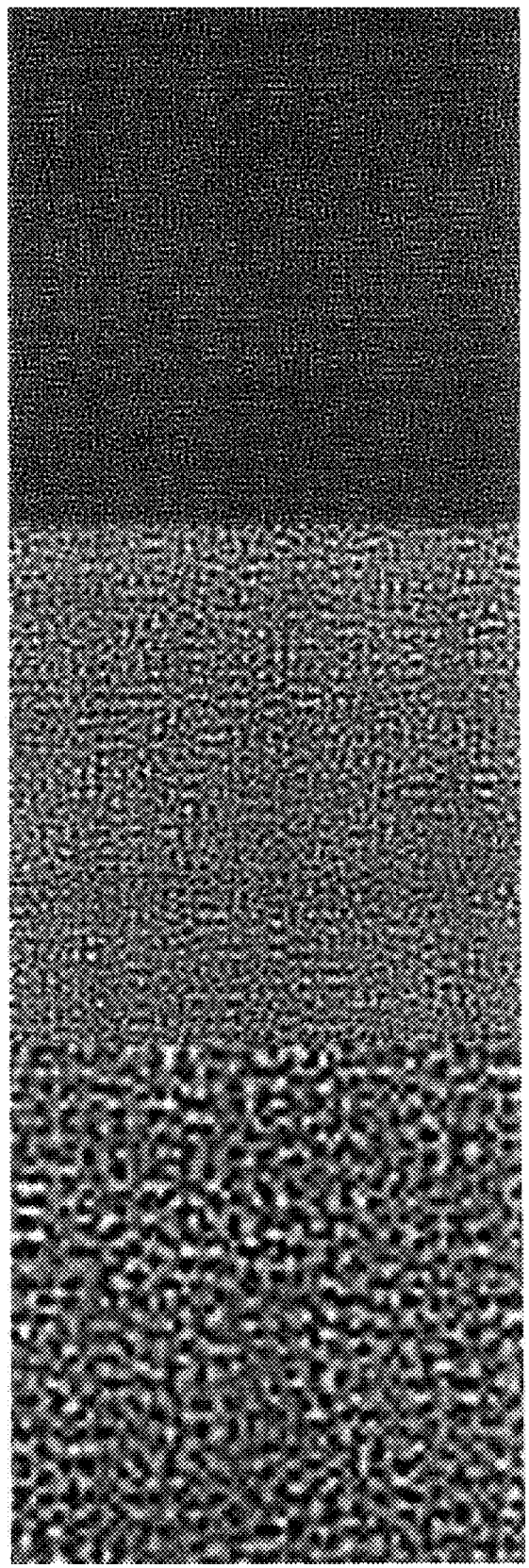
FIG. 13 is an example of a case where N=3 for the first three detail images, top to bottom, respectively. The data represent about 5×10$^6$ pixels, where the empirical histograms (solid) are to be compared with the theoretical estimate (dashed). The absolute value data are displayed.
Figure 13D:
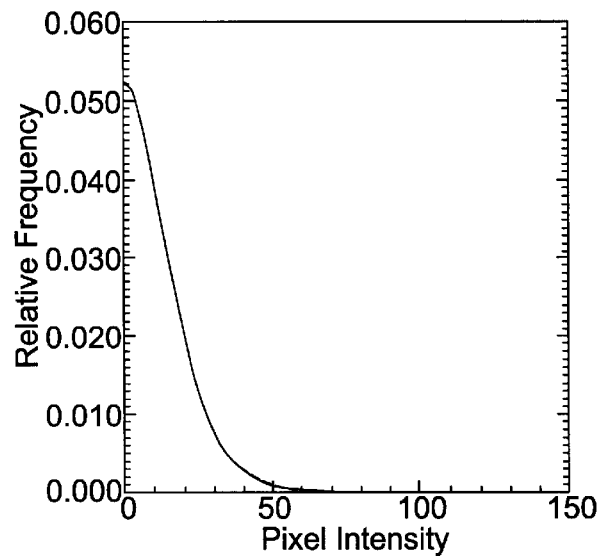
Figure 13E:
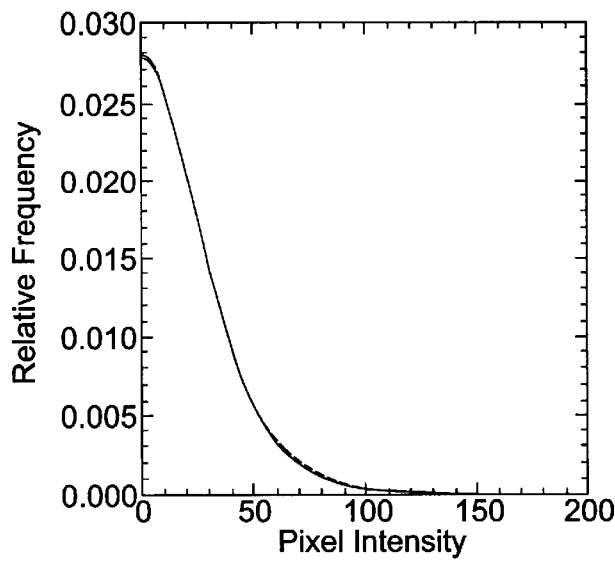
Figure 13F:
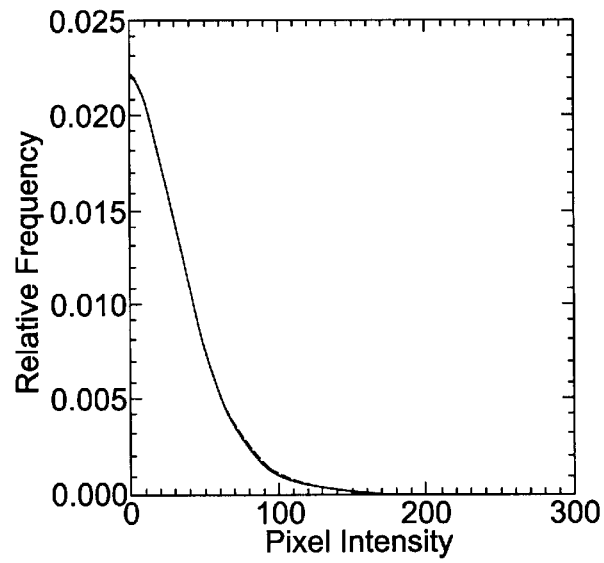

Applicants have found that the expansion probability functions can be approximated by choosing the appropriate integer parameter N in the function:

$$p(x) = \frac{k \exp(-k|x|)}{2^{2N-1}} \sum_{l=0}^{N-1} \frac{2N - l - 2!(2|x|k)^l}{l!(N-l-1)!}$$

where x represents pixel values, and k is a scaling parameter that must be determined, but is of little importance for practical purposes (see FIG. 10 for examples of N=1–4). The above equation results from application of an inverse Fourier transform of the function $$P(\omega) = \frac{k^{2N}}{(k^2 + \omega^2)^N}$$

In an initial mammography study [47, the disclosure of which is incorporated herein by reference] it was assumed that N=1. However, subsequent studies [48] indicate that this work was a special case of a more general formalism. The framework for this generalized expression is also an extension of prior theoretical work [49]. The statistical analysis can be considered as the study of incremental change.

The parameter N can be found by using the data from the expansion images by forming the empirical histograms. These data (empirical histogram) can be input into standard regression analysis that will find the best estimate of N in relation to it. [Regression analysis will find the best N that minimizes the error between the actual histogram curve and the theoretical estimate given in Eq. (3).] An observation stemming from previous investigations indicates that N=1 most often, preceded by N=2, and then by N=3. Images and probability functions for N=1–3 are provided in FIGS. 11–13, respectively. This inference is qualified by noting that it is based on the analysis of a limited data set.

The statistical test in the most general case may change with N (but not necessarily). This implies that the likelihood function (see [47] for this development) must be generated on a per-image basis. One way to do this is to calculate the test for the anticipated range of N (perhaps N=1–5) and catalog the test procedure. Once N is determined, the test is known. The test used is based on the Neyman-Pearson lemma and is based on forming the ratio of two likelihood functions. That is, it is a test designed to disprove a null hypothesis that results in making a calculation (test statistic) in a small region of interest in the image.

2. Extensions to Other Images

The wavelet expansion images of complicated, predominantly low-frequency, fields such as mammograms, chest radiographs, or natural scenes represent small changes as the image is blurred in a coarser version of itself (see Eqs. 1 and 2 in [47]). This statistical analysis can be considered a study of incremental change. It would seem plausible that a similar analysis would translate to the study of the difference between images of the same scene acquired at different times (termed a difference image) for locating other than random changes (such as longitudinal studies in lung imaging for detecting nodules, in mammography for detecting tumors and architectural distortions, or manmade changes in natural scenes). This observation follows directly from Eq. (3) [47]. It would also seem plausible to relax the restriction on N in Eq. (3) and let it take on any positive value resulting in the most general probability model.

C. Probability Model, N=1

Based on our study of the 30 mammograms (more than 5×30=150 $d_j$ images) from the database, a good approximation for the histogram associated with the individual $d_j$ image probability density functions (pdf) is given by $$h(y_j; c_j) = \frac{1}{2c_j} \exp\left(-\frac{|y|_j}{c_j}\right)$$

where $y_j$ represents an arbitrary pixel value and $c_j$ is a constant. The index j is to emphasize that the constant $c_j$ is different for each $d_j$ image. This distribution is known as a Laplace distribution [40] and is the primary statistic. If the random variable (rv) Y is distributed as $h(y_j)$, then a new rv X=|Y| is distributed as a negative exponential distribution given by $$p(x_j; c_j) = \frac{1}{c_j} \exp\left(\frac{x_j}{c_j}\right); x_j \geq 0$$

This function is used for computational purposes and amounts to using the absolute value of the $d_j$ image. This tacitly implies that the $d_j$ image has a symmetric pdf, and that the transform merely folds the left-of-zero part onto the right-of-zero part. The justification is that the $d_j$ image contains no intensity bias (no dc component); in general, there is no reason to expect positive pixel values to be favored over negative values. In Ref. [41], the same pdf was used as a distance measure for determining the local similarity between two similarly structured images for registration purposes. The connection between the work in [41] and this analysis is suggested by the image identity (2).

Following maximum likelihood arguments [42] for independent samples of the variable $x_j$, the parameter $c_j$ from (4) can be estimated by the average value of $x_j$ $$c_j = \langle x_j \rangle$$

We have assumed that the samples of $x_j$ are independent; this is certainly not the case, but it does not pose a serious problem, as can be seen from Table 1. These results are for the image in FIG. 3 and are typical of results of all of the cases studied. The calculated averages of $x_j$ obtained directly from the data are in good agreement with the values obtained from the least-squares analysis of $c_j$. The empirical data are compared with the theoretical pdfs in FIGS. 3a–3e.

TABLE 1

PROBABILITY DISTRIBUTION PARAMETER $c_j$ AND IMAGE AVERAGE $\langle x_j \rangle$ FOR IMAGE $d_j$

| $d_j$ | $d_1$ | $d_2$ | $d_3$ | $d_4$ | $d_5$ |
|---|---|---|---|---|---|
| $c_j$ | 15.9 | 26.6 | 32.6 | 40.0 | 59.8 |
| $\langle x_j \rangle$ | 15.8 | 26.0 | 31.1 | 38.1 | 57.2 |

We find empirically that the $d_3$ and $d_4$ images are most pertinent for calcification detection at this digital resolution. The wavelet transform and subimage selection are similar in some respects to other tried approaches [3], [19], [23], [26] in that the subband images (in the wavelet domain) are selected a priori. For example, the transformation application is not like [23], but the selection is similar. Our method is based on using two independent images after wavelet inversion rather than combining the $d_3$ and $d_4$ components.

By considering the size of the image compared to the number of pixels contained in a cluster, it follows that the cluster has a minimal effect on the global statistic. (There are roughly $5 \times 10^6$ pixels in the image and about 2000 pixels for an average calcification cluster.) Therefore, the primary statistic can be considered as the model for normal tissue. This statistic is useful for developing robust statistical tests.

D. Generalized Method for Determining the Operating Parameters

As stated above, determining the functional form of the probability function for each expansion image determines the normal image region test and results in the test statistic, another probability curve that must be estimated. The test statistic is a calculation that is made in small image regions (for example, 8×8 or 16×16 pixels) across the applicable expansion images. In order to determine the detection threshold the test statistic distribution must be sampled in each expansion image. This implies making the calculation in various image regions (establishing a sample grid) and estimating the distribution.

This test statistic distribution can be estimated in two ways: (1) assume a parametric form as in Section V, or (2) assume a nonparametric form and use a kernel density estimation approach [50]. The second method is more powerful if the data are not exact or if they differ from the assumed parametric function in the first case. The major point here is to estimate the normal tissue behavior of the test statistic; the technique used to estimate this distribution must "wash out" the presence of the calcifications in the curve (if present in the particular case). Both techniques will work; if appropriate, the former is more powerful if the data agree with the functional form, and the latter always will perform providing the bandwidth parameter in the kernel is selected properly.

After estimating the test statistic curve, the operating thresholds must be determined. This is accomplished by making an initial guess and running an experiment on ground-truth data. These are data that are understood. The images are known either to be truly normal or to be abnormal, and if pathologies exist, the locations are known. This training data set must represent a fair cross section of images from the imaging environment in which the detection method will eventually operate. The detection algorithm is implemented, and the results are counted.

Figure 14:
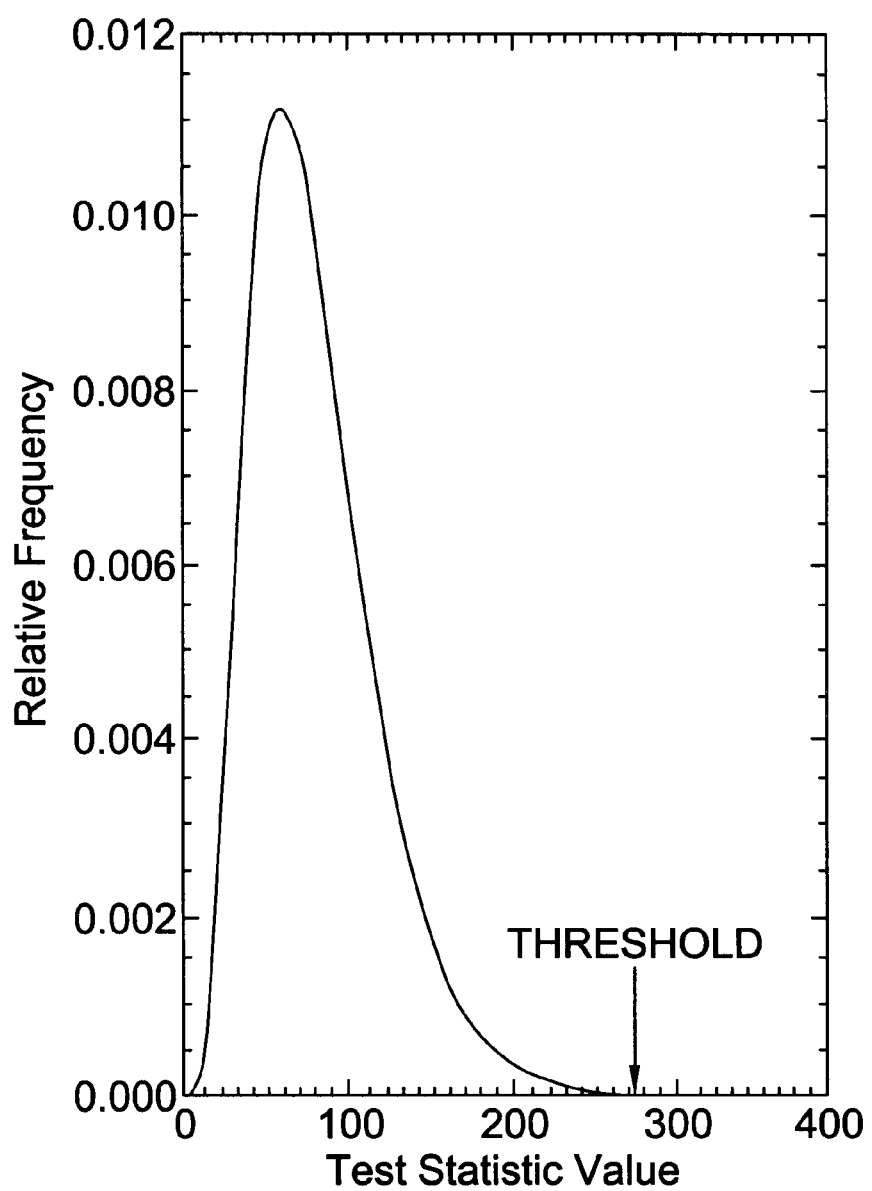
FIG. 14 is a generic test statistic curve indicating an arbitrary threshold. If moved to the right, the first type of error is reduced, and if moved to the left, the second error is reduced at the expense of the first.
Figure 15:
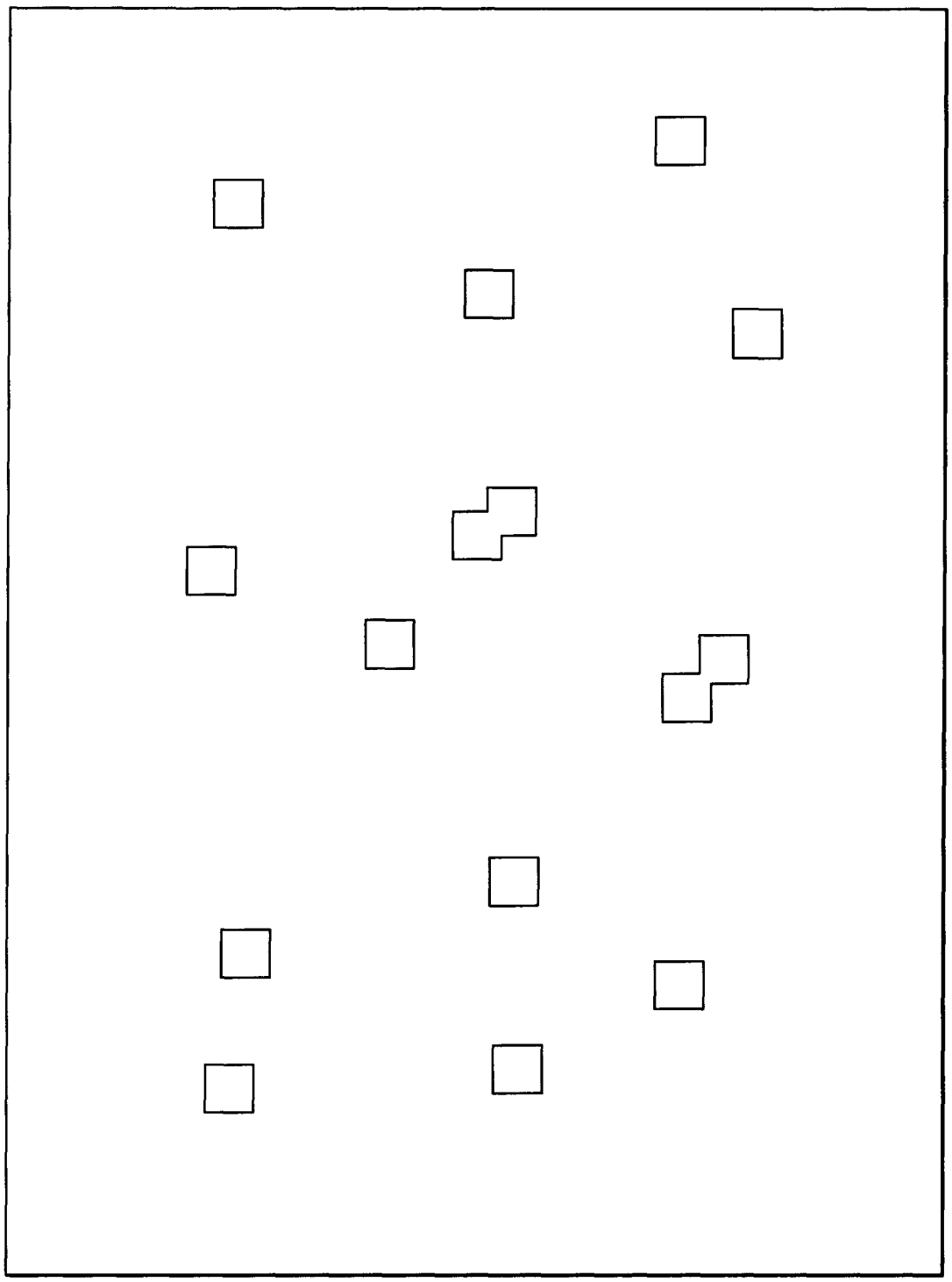
FIG. 15 illustrates generic test output for an image having no calcifications, where the squares enclose suspicious areas. This is an example of moving the threshold too far to the left.
Figure 16:
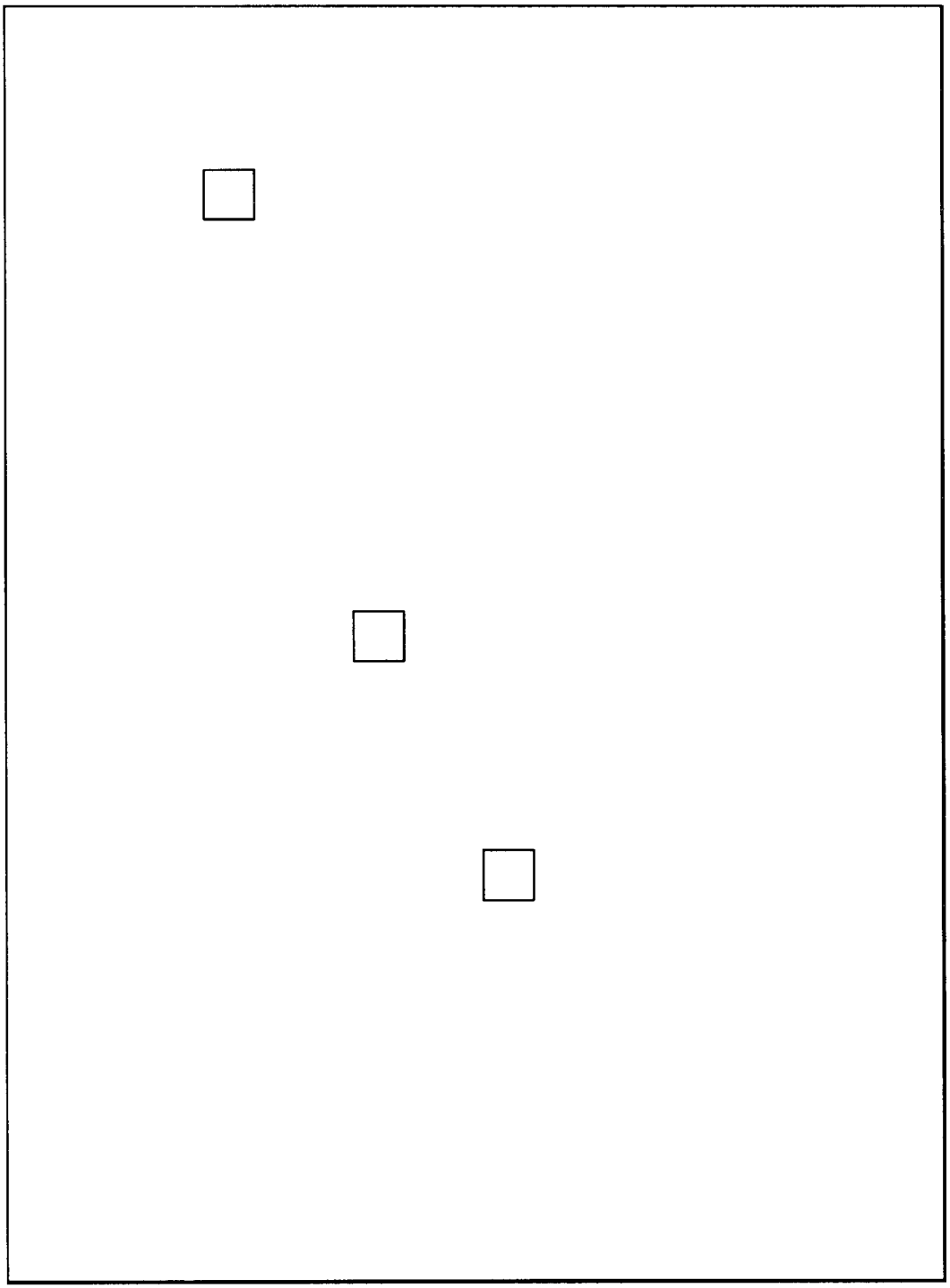
FIG. 16 illustrates detection output image with no calcifications present, where the squares enclose suspicious areas. This is an example of moving the threshold to the right. Note that a relatively small amount of areas are returned.
Figure 17:
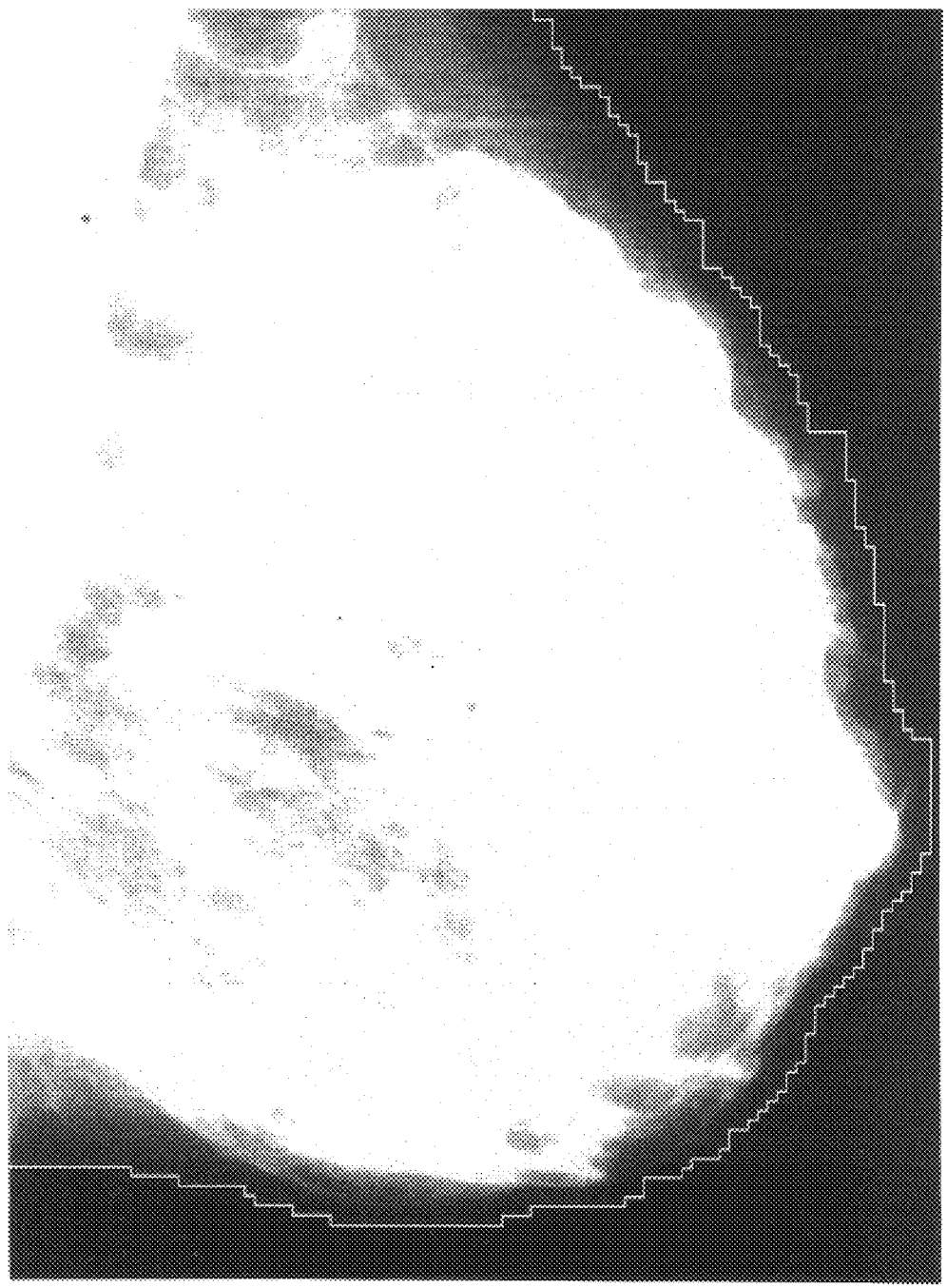
FIG. 17 shows a breast region excised from the off-image noise field. This makes comparisons between the multiresolution properties of the breast field with the off-breast noise field. The detection method enables the breast region to be labeled; the white line marks the separation. The image has been overcontrasted to illustrate the concept.
Figure 18:
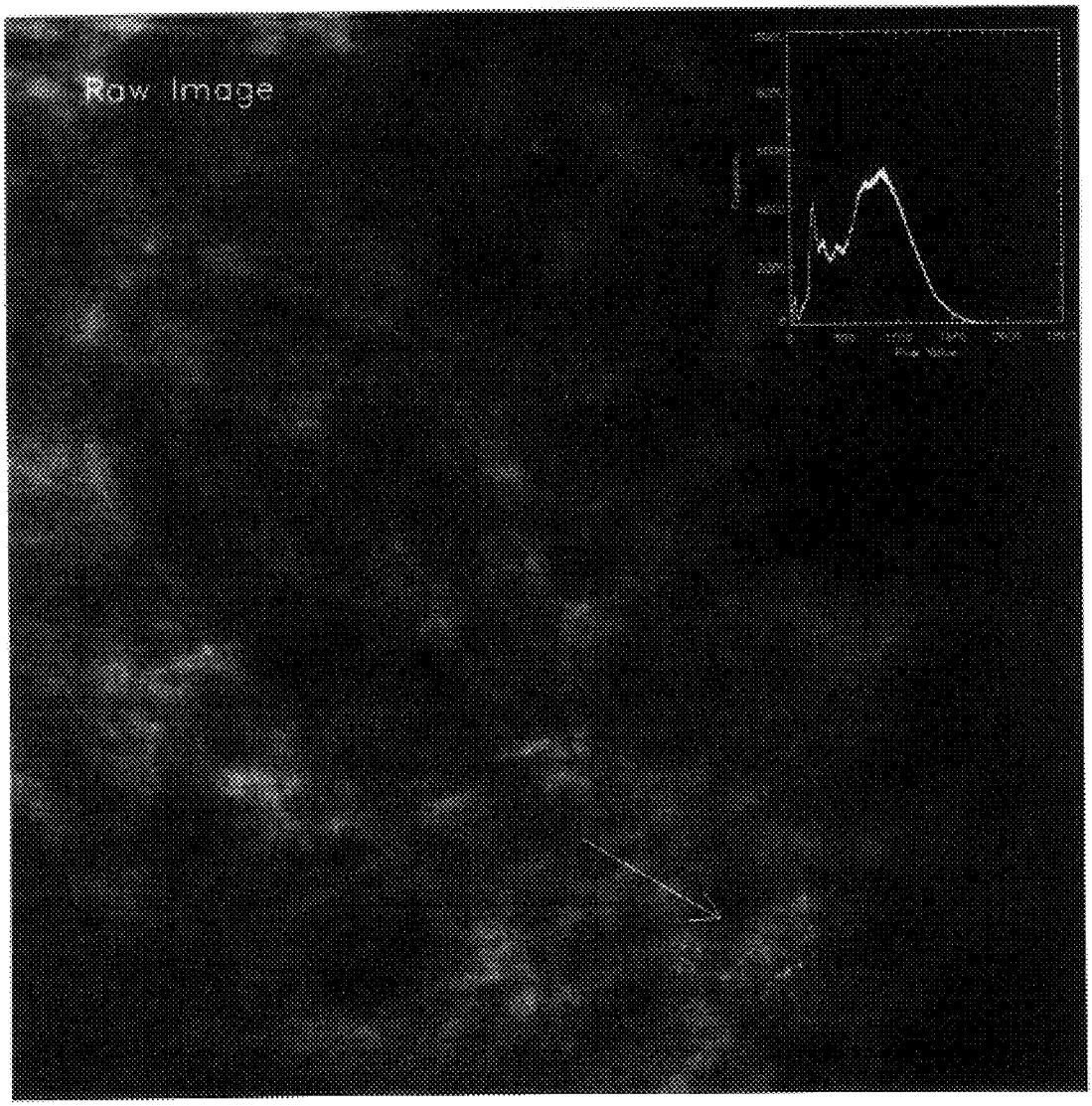
FIG. 18 is a large image section, with the arrow indicating a malignant calcification cluster and associated histogram, upper right.
Figure 19:
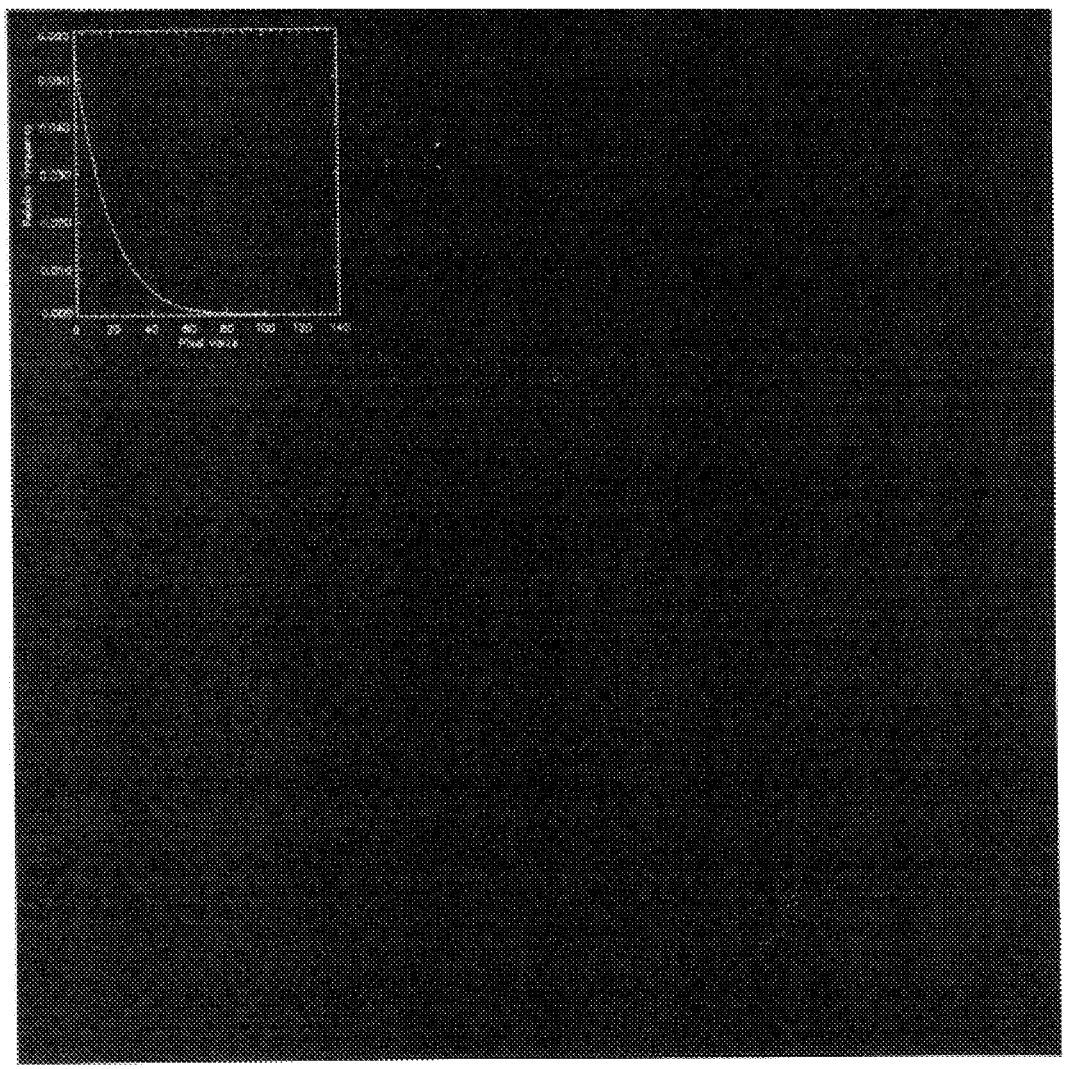
FIG. 19 is the associated $d_3$ image and histogram (solid) and theoretical estimate (dashed), upper left. The absolute value data are used to create the histogram. Note the regularity of the histograms.
Figure 20:
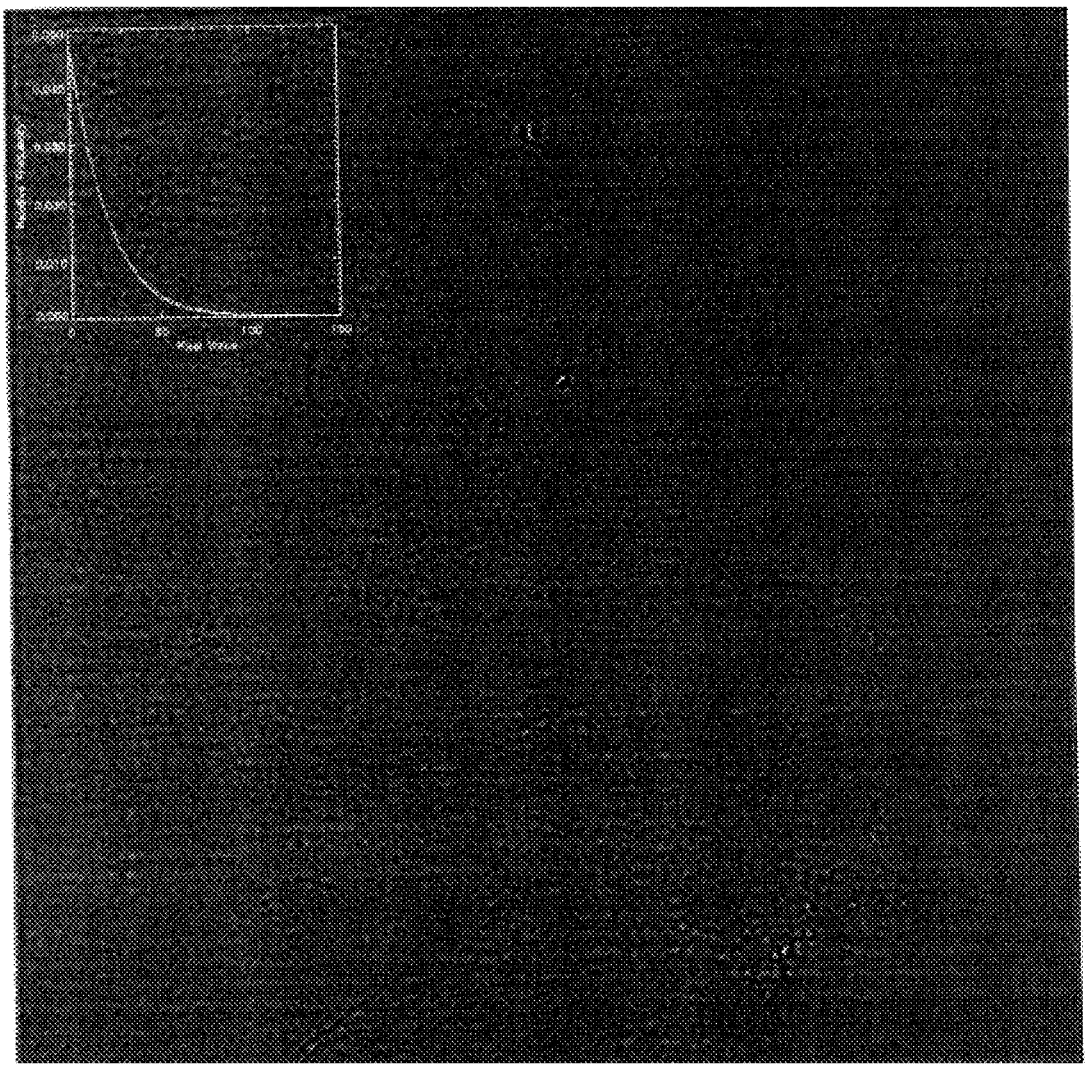
FIG. 20 is the associated $d_4$ image and histogram (solid) and theoretical estimate (dashed), upper left. The absolute value data are used to create the histogram.
Figure 21B:
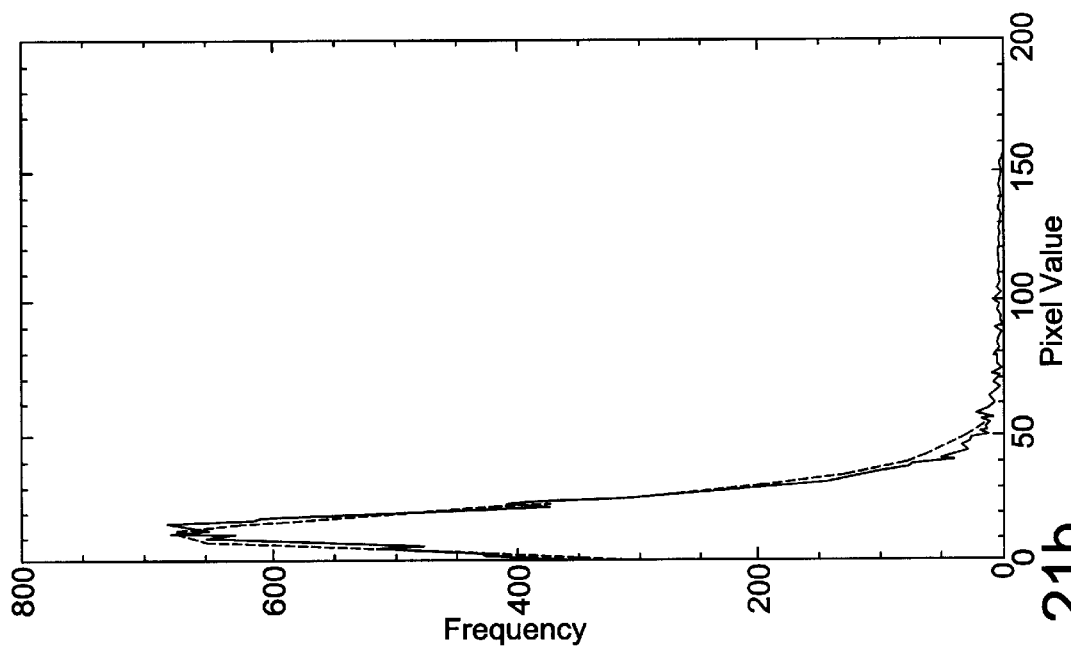
FIG. 21a is the $d_3$ and FIG. 21b $d_4$ test statistic curves: theoretical (dots) and empirical (solid). For this case a functional form was assumed.
Figure 21A:
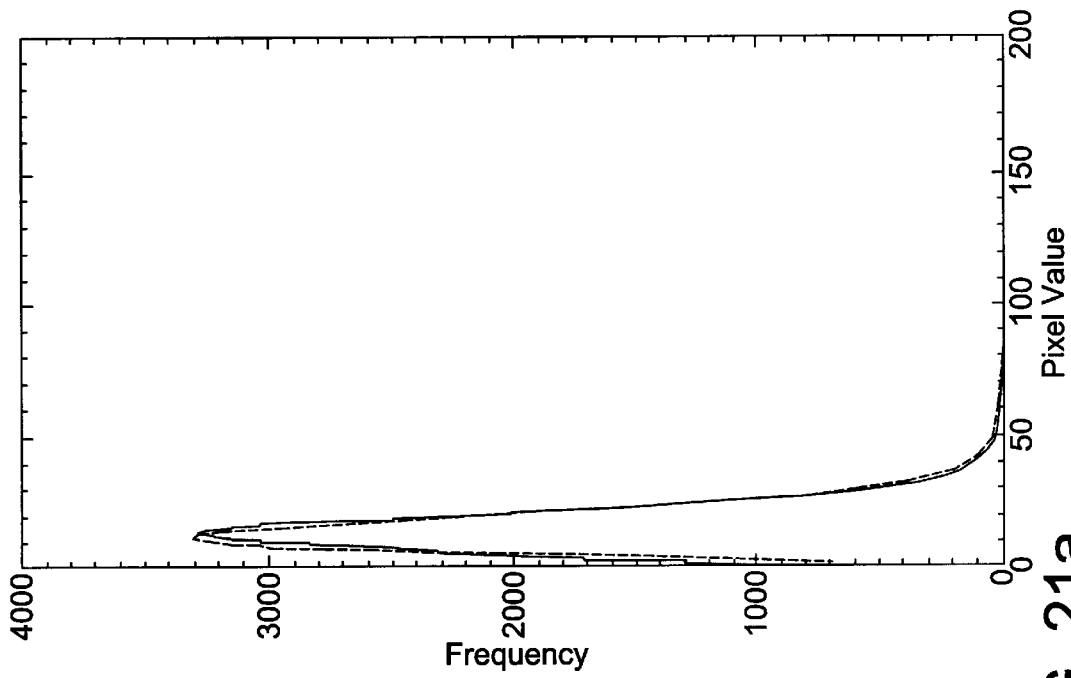
Figure 22:
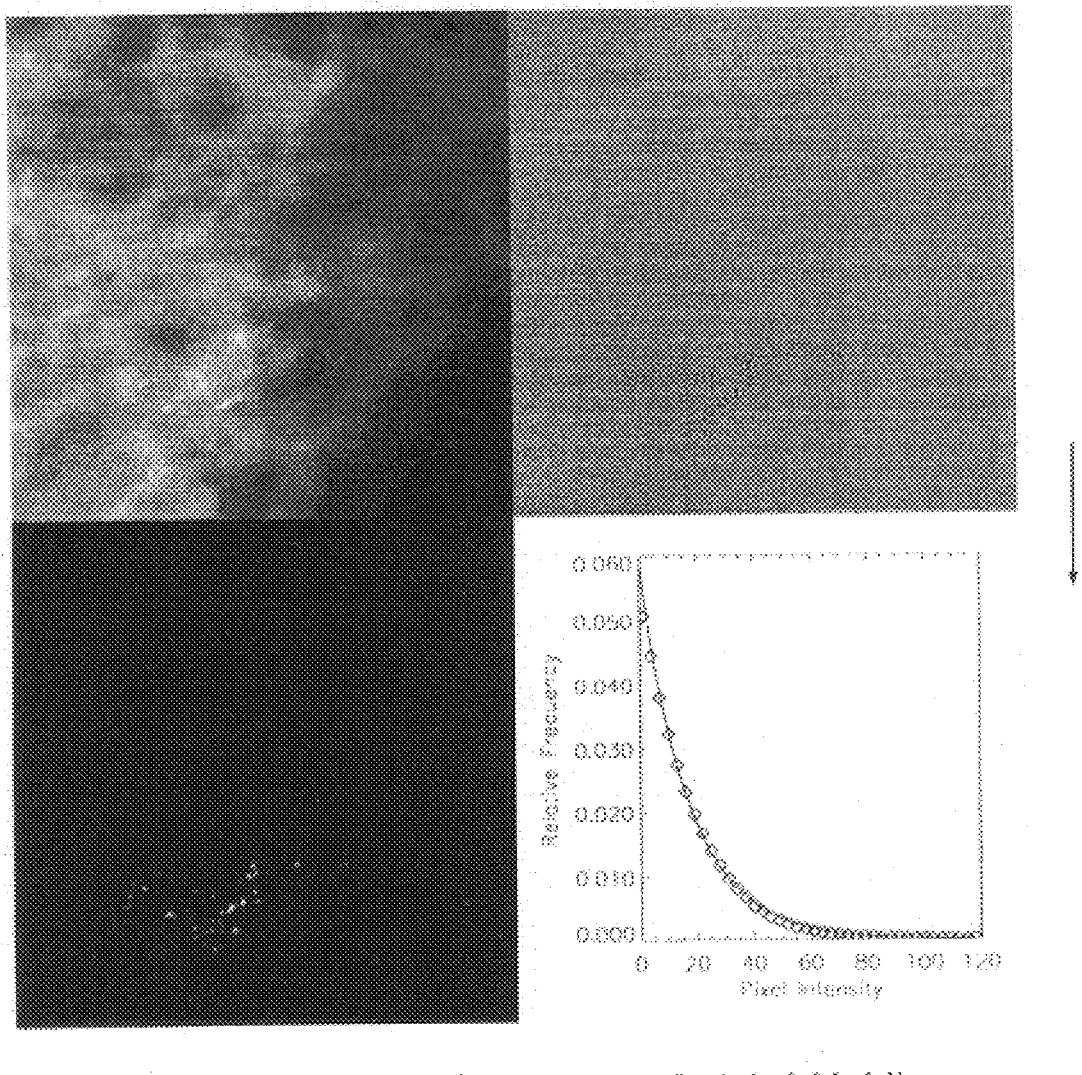
FIG. 22 shows the detection flow for one stage.
Figure 23:
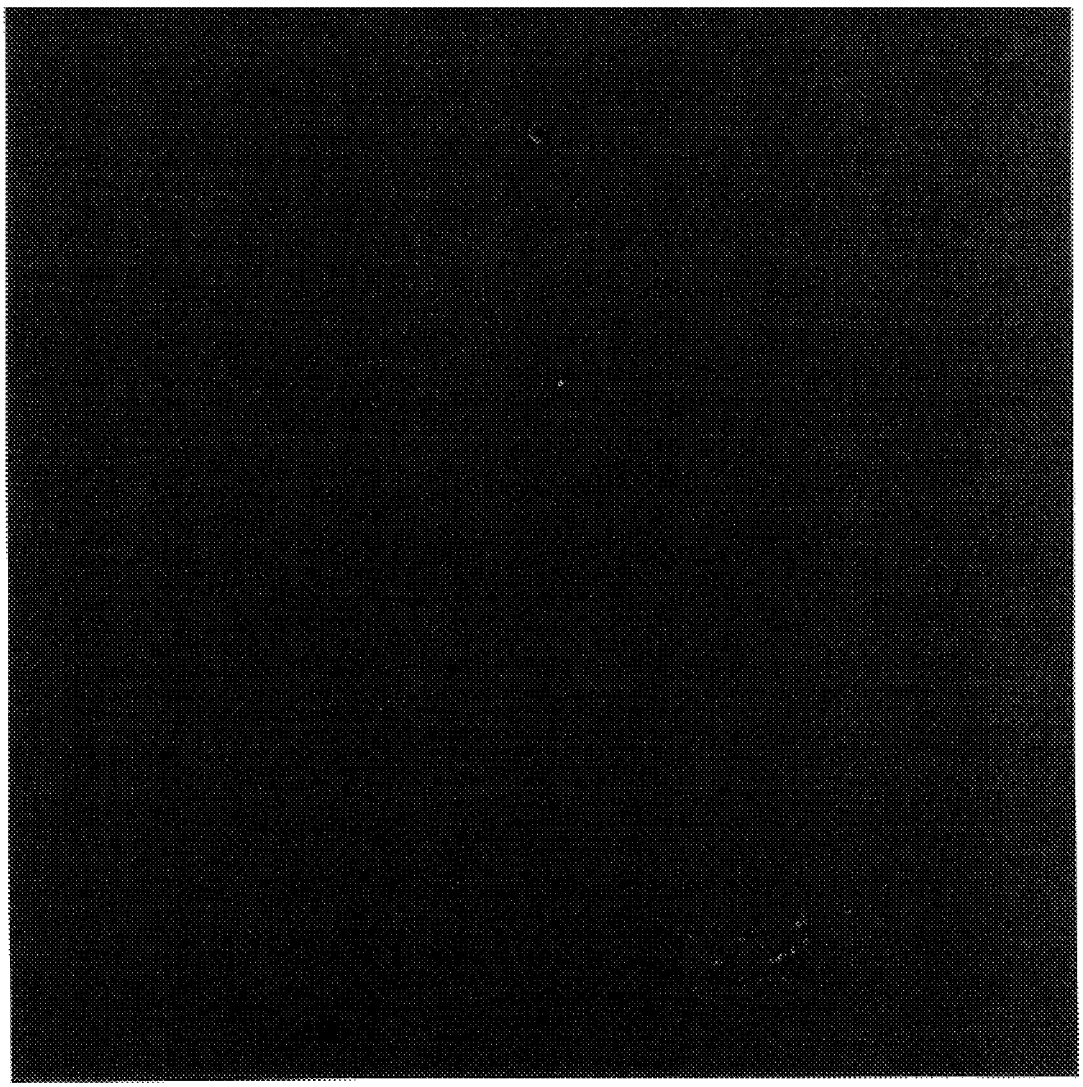
FIG. 23 shows the detection output resulting from projecting the binary mask into the sum of the first five detail images. This image is ready for further processing if desired.

In detection problems of this kind there are two opposing errors: (1) Assume the area is abnormal when it is normal; or (2) assume the area is normal when it is not. The connection between the threshold and these error rates is easily assessed from the generic test statistic curve (FIG. 14). This curve is an approximation of the normal test statistic behavior. In theory there is an additional curve that describes the abnormal behavior; we do not know this curve, but hypothetically it will overlap the test statistic curve in the right tail section, where more overlap implies more confusion in the decision process (in effect this procedure is assessing this unknown curve). The effect of moving the threshold can be observed in the sample detection output (FIGS. 15 and 16). As the threshold is moved to the left, more regions will be declared as abnormal that are really normal (this is in a direction where the hypothetical curve of the abnormal tissue is dying out; FIG. 15). As the threshold is moved to the right, all areas that are normal will be declared normal, and the infringement on the hypothetical curve will result in declaring abnormal image regions as normal (FIG. 16). This approach allows the calculation of the first error; the portion of the area under the test statistic curve from the threshold to infinity (to the right) results in the fractional error of declaring an image area abnormal when it is normal.

In order to find the optimal tradeoff between the two errors, the experiment is preferably run many times, and the detection results are counted. Plotting the results will indicate the best operating parameters. There are two ways that this can be accomplished: (1) vary the two thresholds (one for each expansion image) in unison; or (2) vary the thresholds independently. In addition, if the tests are different for different N, further subclassification may be necessary, where all like N are segregated into one class, and thresholds adjusted by the value of N independently (this is the most general case).

Thus the method and system of the present invention accomplish the following:

- The technique uses a multiresolution analysis that allows that patient to become its own reference for normality for a given digital system and imaging protocol, permitting great generality.
- The multiresolution expansion supports the parametric analysis, which would otherwise not be possible.
- The actual image data dictate the test, as opposed to forcing a test on the problem.
- Reasonable estimates of the error rate can be made. Therefore, an assessment can be made in advance of the possibility of declaring an image region abnormal when it is normal.
- The approach comprises a statistical analysis of incremental change, which is a vital component of the analysis.
- The analysis of incremental change should translate into the serial analysis of difference images (the difference between the same scene acquired at different times), with applications in longitudinal (time series) mammography, chest radiography, magnetic resonance, and general natural scene analysis.

E. Background Analysis

Traditionally, the background has been loosely defined as the information that is responsible for the irregular contrast qualities and variegated appearance of the image. It has been recognized that the background information presents a problem for detection techniques [12]; in particular, dense tissue (which appears bright) is a major factor in making certain mammograms harder for both machine and radiologists to interpret [43], [44]. When the low-frequency constituent is separated (this comes from discarding the $f_j$ constituent; see FIG. 2b), the dense and fatty areas (fatty regions appear as dark areas in the raw image) appear with equal contrast; this is illustrated in FIG. 2c. A conclusion may be that the radiologist should be given the option to view the entire image in conjunction with any combination of detail images with or without the background subimage included. In essence, this method for removing the background is a linear technique that restores contrast to the entire image.

Although our studies on modeling the low-frequency $f_5$ and $f_6$ distributions have not yet yielded any firm analytical conclusions, some qualitative observations can be made as to general trends associated with many images. The irregular structure of the raw image pdf appears multimodal, as shown in FIG. 2a. Note that the irregular structure of the raw image distribution is also present in the low-frequency image pdf and can be observed by comparing FIGS. 2a and 2b. A formal definition of the irregular background can be given in terms of the orthogonal decomposition of the image; it is the information contained in the $f_5$ or $f_6$ subimage.

IV. Hypothesis Testing

The following demonstrates a method for developing the normal image region test for the special case of N=1. The mechanics of the method are the same for arbitrary N, although the functional form of the pdf changes. Application of the Neyman-Pearson lemma [42] leads to a robust statistical test based on knowledge of the primary statistic. [In the following discussion n is the size (8×8=64=n) or (16×16=256=n), of a small region of the $d_j$ subimage.] For n samples of the rv X with pdf given by p(x; c) and from (4), the likelihood function is defined as $$L(x; c) = \prod_{i=1}^{n} p(x_i; c)$$

This is the joint pdf for n independent samples of the variable X; again the correlation between successive samples of X is ignored. A test can be derived from evaluating the possibility $H_0$ that $c=c_o$ (for normal region) against the alternative $H_a$ that $c=c_a$ (for abnormal). The parameter $c_0$ is associated with the global or normal statistic of the $d_j$ subimage. By implementation of a procedure, known as the null hypothesis, a hypothesis is set up to see if it can be rejected. The likelihood ratio test to reject $H_0$ is given by $$l = \frac{L(x; c_0)}{L(x; c_a)} < K$$

where $c_a > c_0$ and k is a constant to be determined. This is the ratio of the joint pdfs, or likelihoods, and results in two alternate choices: (1) accept the region as normal (accept the null hypothesis) if the ratio is not too small; (2) reject the null hypothesis and assume the region is suspicious. If the ratio is small the probability is greater of rejecting the null hypothesis. The rejection criterion must be determined and is addressed in the next section. Applying this test specifically to the $d_j$ image primary statistic results in $$\left(\frac{c_a}{c_0}\right)^n \exp\left[-\left(\frac{1}{c_0} - \frac{1}{c_a}\right) n\langle x \rangle\right] n < K$$

The natural logarithm of this expression, followed by some rearranging, gives $$\langle X \rangle > \left(\frac{c_a c_0}{c_a - c_0}\right)\left[-\log \kappa - n \log\left(\frac{c_0}{c_a}\right)\right] n$$

The quantity on the right-hand side of this equation is a positive constant, designated by γ. Thus the discriminating test is $$\langle x \rangle > \gamma$$

The hypothesis $c=C_0$ is rejected (the region is not normal) if <x> is too large. Clearly, there are two types of errors involved with this decision: (1) decide to reject the null hypothesis and assume that the region is suspicious when it is not. In classical detection theory this is known as a false alarm and is analogous to the standard medical imaging false positive (FP) error; or (2) decide to accept the null hypothesis and consider the region as normal when it is not. In medical imaging terminology this is a false negative (FN). The value of γ determines the FP rate. In order to select this value, and thus set the desired FP rate, the sample distribution for the parameter c must be found.

It is important to emphasize that the likelihood ratio test gives an analytical method for comparing image regions against some global criterion. However, the approach does not reveal the spatial extent of the comparison; this must come from empirical evidence.

V. Summary Statistic and Error Rates

A summary statistic is the governing probability for the parameters of the primary distribution. Specific to this case, the distribution of $C_j$ from (4) is of interest. This distribution is found by establishing a sample grid in the absolute value $d_j$ image and calculating the average at each grid site. The grid is established by dividing the image into 8×8-pixel or 16×16-pixel square blocks for the $d_3$ and $d_4$ images, respectively.

TABLE 2

| | SUMMARY STATISTIC PARAMETERS | | | |
|---|---|---|---|---|
| j | $\alpha_j$ | $\beta_j$ | $\alpha_j \beta_j$ | (c_j) |
| 3 | 3.08 | 10.3 | 31.7 | 30.1 |
| 4 | 3.38 | 10.6 | 35.8 | 36.4 |

Figure 4A:
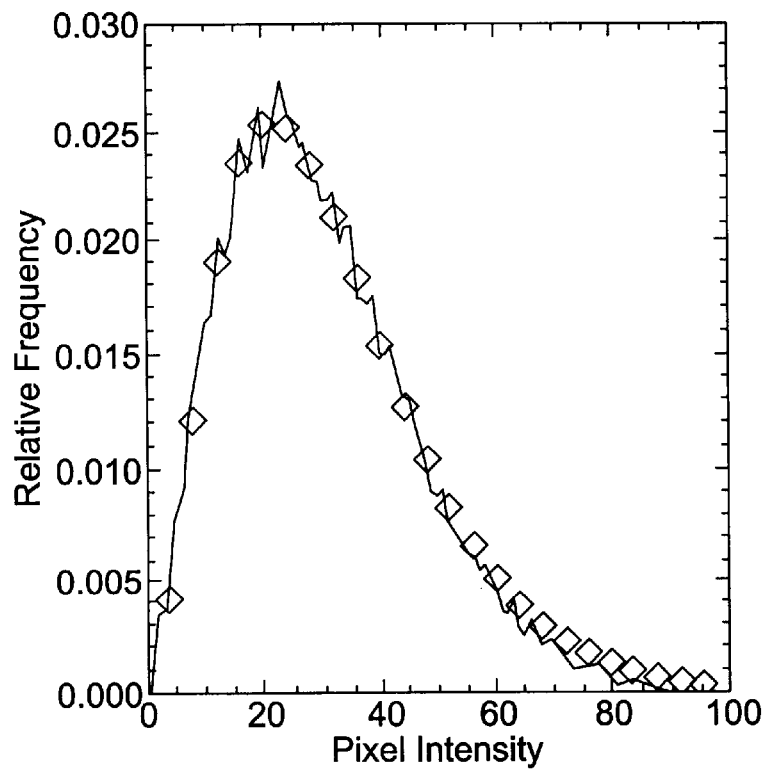
FIGS. 4a and 4b are the summary statistics for the $d_3$ and the $d_4$ subspace images, respectively. These cases are a fair representation of the theoretical and empirical agreement for all images studied.
Figure 4B:
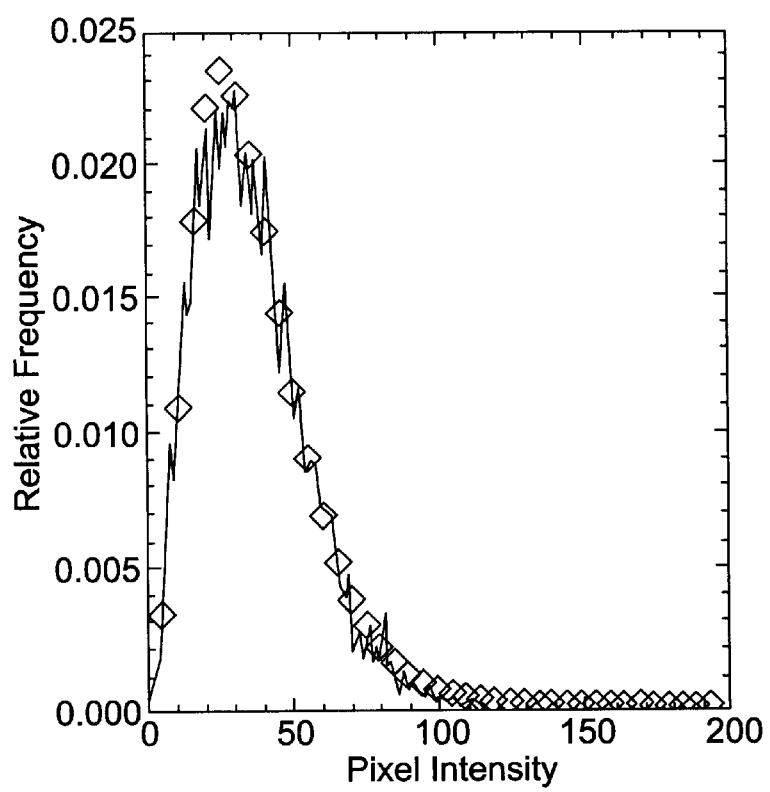
Figure 5:
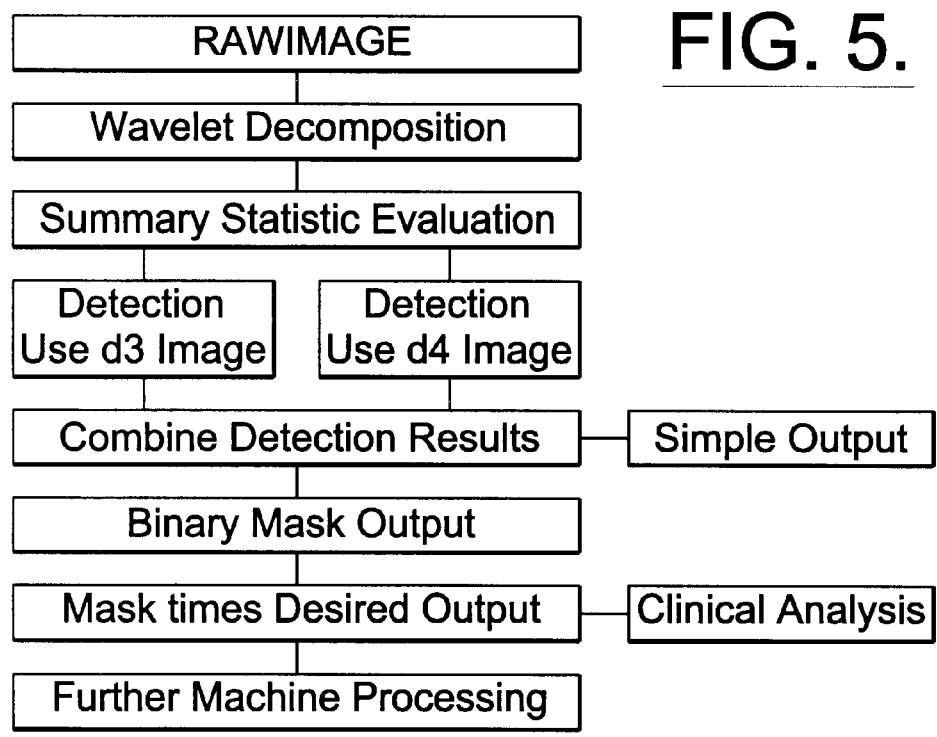
FIG. 5 is the detection flow chart for mammography.
Figure 6:
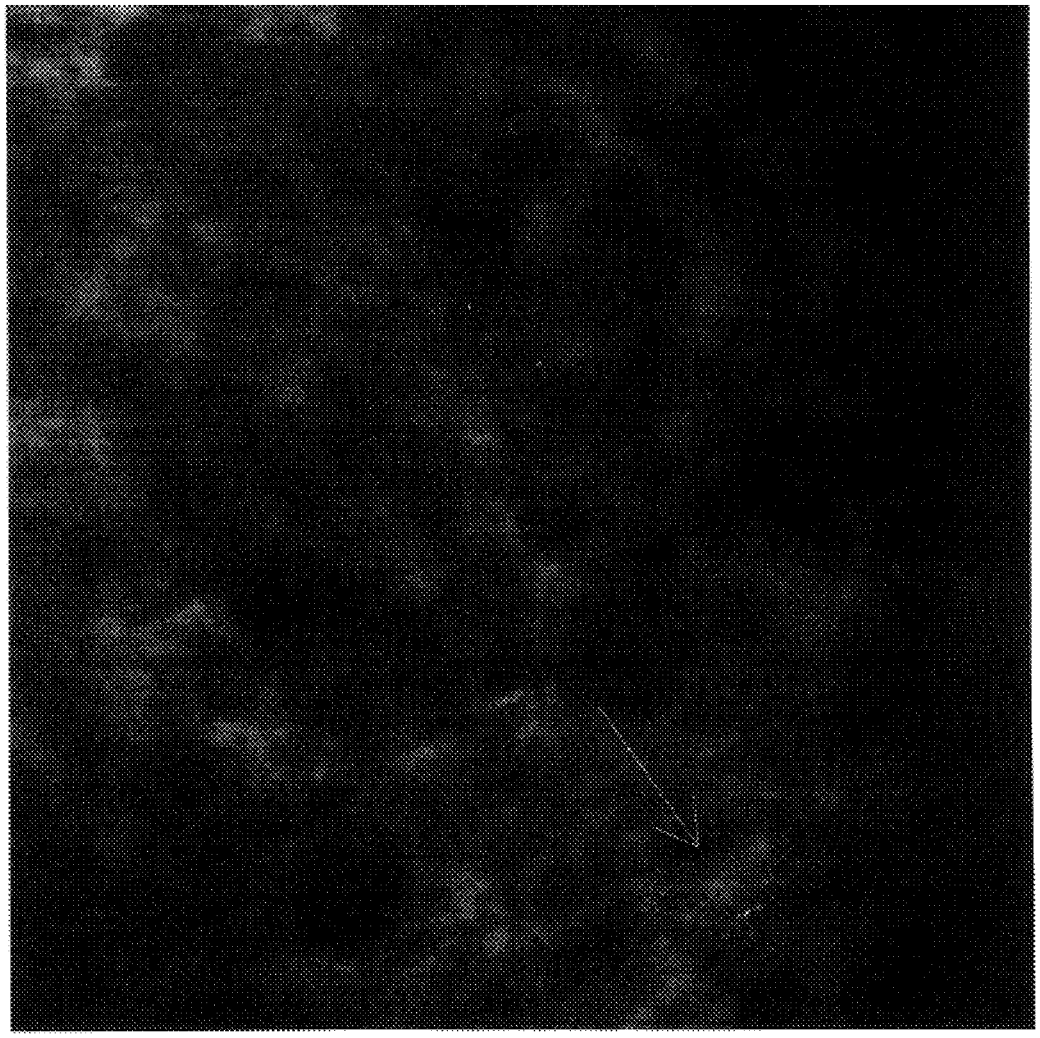
FIG. 6 is the raw image 2048×2048 pixels scaled by a factor of 2/5 for viewing purposes. The arrow points to the region containing the biopsy-proven cluster.

(This aspect of the study is restricted to the j=3 and 4 subimages because these are the most relevant for resolving calcification in mammograms digitized at 35 µm.) The varying window size is due to the expected spatial extent of calcifications that may appear in the respective subimages. The average is calculate for each block, and this results in a new image or map of the local averages. The image resulting from this procedure is reduced in both dimensions by a factor of 8 or 16, depending on the subimage. The normalized histogram of the map is the empirical distribution of the parameter $c_j$. A gamma distribution [45, ch. 17] works well as an initial estimate $$g(c; \alpha, \beta) = \frac{1}{\Gamma(\alpha)\beta^\alpha} c^{\alpha-1} \exp\left(-\frac{c}{\beta}\right), c > 0$$

where α (the scale factor) and β (the scale factor) are positive constants. Here the index j has been dropped for brevity. There are good reasons for using the gamma distribution: (1) for α=1, it reduces to the negative exponential distribution; (2) if n mutually independent gamma-distributed variables with the same scale factor are summed (in our case, n=64 or 256), the new variate has a gamma ($\alpha_1$ + . . . +$\alpha_n$, β) distribution [46]; and (3) this distribution is flexible enough to accommodate various functional forms. An argument against this distribution comes from pixel correlation within the $d_j$ image. However, this detraction does not appear to be a serious problem; that is, the empirical evidence strongly supports using this distribution. Optimum values for the parameters (using the same images as for Table 1) are tabulated in Table 2, and FIG. 4 shows the empirical distributions contrasted with the estimated curves for the $d_3$ and $d_4$ images.

The mean of the gamma distribution is given by the product αβ and should be compared with the mean calculated directly from the data <c>. This average can also be compared with $c_3$ and $c_4$ from Table 1. The smaller values in Table 2 are expected due to the integer rounding; the distribution images are saved as short integers.

An error of the first kind or FP rate can be estimated from this pdf prior to detection processing. Again, it is assumed that the calcified regions have a minimal effect on this distribution and can be considered as outliers located in the far right tail region. The FP rate (the fractional number of false calcifications per image) can be obtained by $$P_f = \int_\tau^\infty f(c; \alpha, \beta) dc$$

where $\tau$ denotes the threshold. This equation deserves special consideration. The test criterion given by $<x>>\gamma$ is obtained as follows: (1) select $\tau=\gamma$, (2) pick a value for $P_f$, and (3) solve this equation for $\tau$. The total expected number of FPs in the entire $d_j$ image can be approximated by $$FP(total) \sim P_f \times (\text{number of pixels in reduced image})$$

It should be emphasized that this is an estimation that may be obtained as an average after processing many images. The intriguing aspect is that the FP rate $P_f$ can be set prior to detection. However, this does not completely specify the error prediction, since no preprocessing estimation can be made concerning the error of the second kind or FN rate. The FN rate follows from the calcification distribution, which is unknown.

VI. Localized Normal Tissue Recognition

The detection technique is implemented by shifting an 8×8- or 16×16-pixel search window though the $d_3$ and $d_4$ images, respectively. A detection flow diagram that illustrates the various stages of processing is given in FIG. 5. The intent is to match the search window size to the average spatial extent of the calcifications that may exist in each subimage. When the spatial extent of the wavelet function and calcifications are similar, the response (in the $d_j$ image) is maximized and the area is flagged as suspicious.

Figure 7:
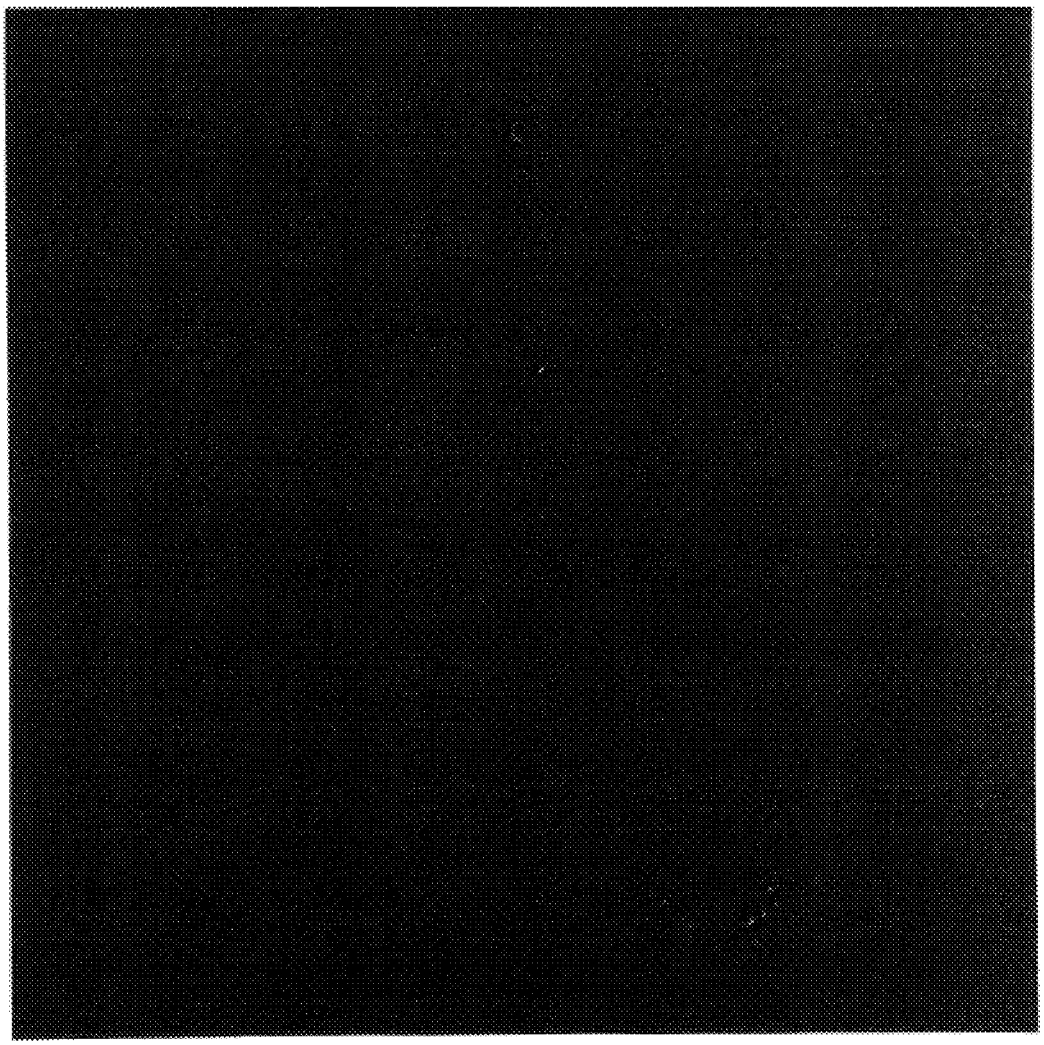
FIG. 7 is the total combined detection mask projected into the sum of the first five detail images.

For early cancer detection calcifications with spatial extent less than ≈0.5 mm are most important for clinical diagnosis. This corresponds to calcifications ranging roughly from 16 pixels to three or four pixels in diameter (≈0.1 mm), and the search window is matched to this scale. We assume that calcifications smaller than this are not discernible. The window is shifted with a 50% overlap in both spatial dimensions during the search; this is to reduce the risk of missing a feature (calcification). When a region is assumed normal (accept the null hypothesis), it is set to zero. If the null hypothesis is rejected (accepted as suspicious), the region is left intact. This is how potentially small calcified regions are detected by default. Following the independent detection, the images are combined and the total detected image results as the output. In effect, the dual output combination can be viewed as a mask. From this mask, any $d_j$ image combination or even the raw image can be returned as the output image. This can be accomplished by making the total output image into a binary image (ones or zeros) and simply multiplying by the desired type of output. This is important if further processing is desired because the calcified regions can be returned with full resolution and detail. For demonstration purposes, we choose an image with a wide variety of aberrations illustrated in FIG. 6. The arrow indicates a biopsy-proven calcification cluster. The detection output is from the sum of the first five $d_j$ images. These results are illustrated in FIG. 7.

The detection scheme takes into account that calcifications have a spatial extent or connectivity quality; a calcification appears as a clump of large pixel values and normal regions have a diffuse distribution of pixel values. The regions considered are matched to spatial scale by adjusting the search window size accordingly. The window size and shift increment are a compromise. If the window is greater than half the size of the feature and the shift greater than half the window size there is a possibility that the feature will be missed. Assume that the smallest object to be detected has a spatial extent M, a 2M×2M window must be used and shifted with an increment of M to ensure that the object will not be missed. The window is most sensitive when the feature fills it entirely, which is not generally expected here. An alternative method would be to scan the image with the limiting window size and single pixel increments, but this may add many FPs to the outcome.

Figure 8:
FIG. 8 is the $d_3$ detected image, binary output
Figure 9:
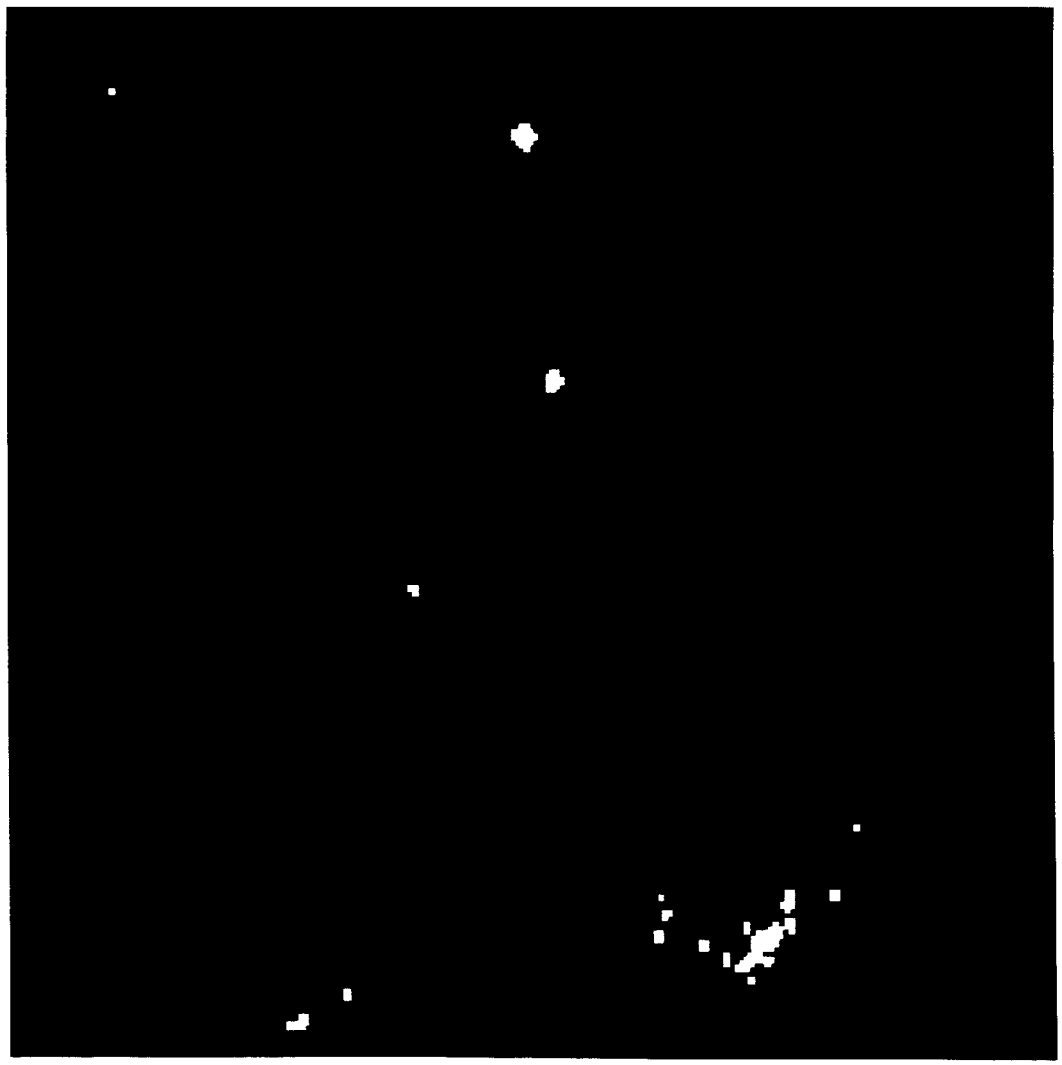
FIG. 9 is the $d_4$ detected image, binary output.

Although not apparent, there is redundancy built into this detection scheme. This can be assessed by looking at the $d_3$ and $d_4$ detected images prior to recombination, see (FIGS. 8 and 9). There are flagged regions in the $d_3$ image that are not flagged in the $d_4$ image and vice versa. This indicates that the wavelet response to the feature was stronger in the respective image. However, in some regions the test is triggered in both images at roughly the same spatial location. This indicates that the wavelet function response is similar to both images (relative to the background and window size). Thus some calcified regions have the possibility of being detected in both images, which represents a redundancy. This can be viewed as a safety measure.

The focus of this detection scheme is very localized. However, a possible sign of early cancer is the presence of a microcalcification cluster, and this is of more clinical concern than isolated events. A single cluster is defined roughly as 3–5 microcalcifications assembled within a square centimeter. This definition implies that one or two calcifications within a square cm are not clinically important. In order to reach the goal of recognizing images that are normal from the clinical point of view clearly requires another stage of processing.

The additional stage of processing is needed to eliminate FP normal diffuse regions on the order of a square cm. The FP normal diffuse region may result from isolated events within a square cm proximity: two PF calcifications (flagged regions that are normal) and one true calcification (a correctly flagged region); vice versa; or three FP regions.

VII. Experiment, Analysis, and Evaluation

In this section the experimental implementation of the ideas expressed in Sections II.D and V are shown. In addition, the error rates are demonstrated to be assessable in advance by knowledge of the test statistic.

A. Experiment

The localized normal region detection must be conducted such that the FN and FP rates are optimized. These rates are in opposition in that decreasing one causes an increase in the other. In terms of the threshold, if $\tau$ is set low enough the FN rate can be reduced to zero, but then the FP rate is high. So the problem is to adjust the threshold. We want the threshold as high as possible while keeping the FN rate essentially zero. This optimum value can be found by probing the detection operating characteristics. We do this by processing the images 5 times, each time with a slightly higher threshold, or equivalently, a lower value for $P_f$.

B. Analysis Method

The evaluation of the local area detection method for each of the trials was performed by a resident radiologist using three figures of merit. [First, for clarification, a true positive (TP) with respect to an isolated calcification is defined as: a calcified region, benign or malignant, that has not been set to zero. The TP cluster follows from this definition also.] The figures of merit are: (1) the isolated FP calcifications per image; (2) the number of TP clusters; and (3) the number of FN clusters. The cluster analysis is based on the biopsy verified ground truth files, and the results are presented as averages. There are many methods used for counting clusters; consequently, the technique used here requires a brief explanation.

Following from the definition of a cluster (as defined previously), if three events are located (this includes FPs or TPs) within a square cm, the region is classified as a cluster. If the nearest-neighbor calcifications of two different clusters are within a cm in either the horizontal or vertical direction, the total cluster is counted as one; this is sometimes defined as a diffuse cluster situation, and it admits the possibility of chaining clusters together.

C. Tabulated Results

The five sets of detection results are shown in Table 3. Each trial corresponds to a different threshold $\tau$ or $P_f(\tau)$. The thresholds corresponding to the five trials are arranged so that $\tau_1 < \tau_2 < \ldots < \tau_5$, and the corresponding values of $P_f \times 10^4$ are in the last column. The goal is to identify the $\tau$ where the experimental value of the sensitivity begins to drop below 100%. In this table, the following definitions are used:

$$\text{Specificity} = \frac{\text{Number of normals correctly classified}}{\text{Total number of normals}}$$ and $$\text{Sensitivity} = \frac{\text{Number of clusters found}}{\text{Total number of abnormals}}$$

In going from trial 1 to trial 2, there is no measurable change in the evaluation. This means $\tau$ was not changed enough. The parameters associated with trial 3 are the best, since it is possible to keep the sensitivity at 100%, and still identify 46% of the normals.

An estimate for the theoretical maximum number of isolated (individual) calcifications per image can be found by the formula $$\text{Max} = 2 \times P_f \times \frac{18 \times 256 \times 256 + 12 \times 256 \times 128}{30}$$

and the minimum is given by: Min=Max/2. This formula comes from considering that there are two reduced images for each raw image and there are two possible sizes of reduced images (256×256) or (256×128). There are 18 large images and 12 small images. The Max is two times the Min because both $d_3$ and $d_4$ can contribute to detection, and it is possible to have no overlapping error in each image. These results are summarized in Table 4.

TABLE 3

EVALUATION OF EACH OF FIVE TRIALS

| Trial | Specificity % | Sensitivity % | FP clusters/image | $P_f(\tau) \times 10^4$ |
|---|---|---|---|---|
| $\tau_1$ | 15 | 100 | 1.20 | 6.00 |
| $\tau_2$ | 15 | 100 | 1.36 | 3.00 |
| $\tau_3$ | 46 | 100 | 0.93 | 2.50 |
| $\tau_4$ | 46 | 94 | 0.67 | 1.00 |
| $\tau_5$ | 92 | 89 | 0.13 | 0.05 |

TABLE 4

THEORETICAL LIMITS FOR EACH TRIAL

| Trial | Max | Min | Actual Counts | $P_f(\tau) \times 10^4$ |
|---|---|---|---|---|
| $\tau_1$ | 63.92 | 31.46 | 44 | 6.00 |
| $\tau_2$ | 31.46 | 15.73 | 31 | 3.00 |
| $\tau_3$ | 26.20 | 13.10 | 18 | 2.50 |
| $\tau_4$ | 10.48 | 5.24 | 13 | 1.00 |
| $\tau_5$ | 0.52 | 0.26 | 3 | 0.05 |

D. Observations

The specificity rates (Table 3) are very encouraging, since a feasible operating $P_f$ can be found. In this case, it is trial 3 and only one very subtle detection case is missed in trial 4. This indicates we can hope to operate at 100% sensitivity while identifying 46% of the normal images. The theoretical isolated FP rates (Table 4) are in general agreement with the counted data. As the FP rate is reduced the agreement diverges somewhat because the integral required to find the FP rate is only an approximation. The final detection results are good order-of-magnitude estimates. These evaluation results indicate that the detection method behaves as predicted, and gives credence to the statistical modeling. If the model was merely a crude approximation, it is quite likely the detection results would not be in such close agreement. These detection results can be used to make inferences concerning processing full size images. For the isolated and cluster FP rate the conversion is $$\text{New rate} = \frac{\text{Old rate} \times \text{Full image breast area}}{\text{Cut image area}}$$

Normally a comparison of detection results obtained by different techniques is useful. However, this is not appropriate here for three reasons: (1) Using large image sections without artifacts is equivalent to processing ideal images. (2) The detection process was evaluated on a limited database consisting of 30 images. Excluding one or two images from the study may result in significant changes in detection results. (3) Very little other work has been done at 35-$\mu$m resolution, and no work with common criteria that would allow a meaningful comparison.

VIII. An Example Sequence of Steps for Application to an Image

The following exemplary method can be repeated a plurality of times to find operating parameters using data that have known ground-truth information obtained from using the appropriate protocol.

1. Locate the tissue region to be studied (e.g., a breast region) and eliminate the off-tissue region noise field and anomalous regions.

2. Apply a wavelet expansion and separate at least one important component expansion image (for the example of breast microcalcifications, two expansion images subimages are separated out).

3. Determine the functional probability form for each expansion image.

4. Using maximum likelihood arguments, determine the optimal statistical normal image region test for each expansion image.

5. Apply the test to a training data set using an initial estimate for the thresholds, where in the most general terms, the operating threshold is different in each expansion image.

a. Test each region in the first expansion image (e.g., each 8×8 region in the $d_3$ image). If the calculated test statistic is less than the threshold, set the region to zero because it is assumed normal; else set it to one.

b. Apply the same test to each successive expansion image selected (e.g., each 16×16 region in the $d_4$ image).

6. Form the union of steps 5a and 5b as the total output binary mask.

7. Compare the detection results for all images with the ground-truth data and repeat the process until optimal operating parameters are found.

8. Once the parameters are found, the approach can be applied to the test set following steps 1–6. The process can terminate here or continue.

9. Following step 6, a simple counting procedure can be implemented if desired to eliminate isolated suspicious areas, since fewer than three or five suspicious areas within 1 cm² proximity are assumed to be not important.

10. Project the binary detection mask into the raw image or any combination of detail images for finer classification algorithms (see FIGS. 17–23).

Alternatively, the method can be used as a calcification detection algorithm by adjusting the detection operating parameters (step 5) with different optimization goals.

IX. Conclusions

The detection technique presented here is dictated by the data and follows from the Neyman-Pearson lemma. If the pdf model is a reasonable approximation, this is the most powerful test for finding regions that deviate significantly from normal regions, that is, regions that may contain calcifications or other artifacts of similar scale. In this sense, the test is optimal. In essence, the technique merges two powerful analysis techniques: classical signal detection theory and multiresolution decomposition.

In general, it is illustrated herein that mammograms are not as irregular as commonly believed. The evidence clearly indicates that these mammograms share common statistical qualities. In the vast majority of images studied, a primary and summary statistics appear to be dependable estimators for the detection scheme.

This method of differentiating normal regions from potentially abnormal regions containing calcifications should be considered as the initial stage of processing. It is important that this separation technique be optimal; if it fails, any ensuing processing will naturally fail. As illustrated by the detection analysis, in order to identify a significant fraction of the normal images while maintaining a low FN rate (essentially zero), the isolated FP error needs to be reduced. One way to address this error is with two additional stages of processing: (a1) examine each small suspicious region in more detail for further discrimination, and (a2) consider regions on the order of a square centimeter and eliminate the entire region if the total suspicious area within the region does not meet the cluster criterion of three classifications within a square centimeter. In order to overcome intrinsic FP error (see the summary statistic), the decision criteria for the first additional stage should not be strongly dependent on the previous decision mechanism. The detection mask approach renders itself to further analysis of type (a1), because more information can be included in the suspicious regions by projecting the mask into a more resolved image, as illustrated in FIG. 7. The second additional stage, (a2), can be implemented by a simple counting procedure. These additional stages are being developed.

The detection process was illustrated with the symmlet basis. Other wavelet bases can be used for comparison purposes to optimize the choice of bases. Thresholds can be set the same and the experiment repeated. The 30 images are a fair representation of a clinical mammography database. Thus using the present invention, one can quantify the "best basis" for usage in mammography.

The evaluation results provide a strong impetus for further pursuit and analysis of the multiresolution statistical technique. An automated method should be developed to segregate the isolated calcifications that do not belong to a cluster.

It may be appreciated by one skilled in the art that additional embodiments may be contemplated, including in the analysis of other types of medical (and other) images.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

REFERENCES

[1] K. Doi, M. L. Giger, M. R. Nishikawa, K. R. Hoffmann, H. MacMahon, R. A. Schmidt, and K.-G. Chua, "Digital radiography,"*Acta Radiologica,* vol. 34, no. 5, pp. 426–439, 1993.

[2] W. M. Morrow, R. B. Paranjape, R. M. Rangayyan, and J. E. L. Desautels, "Region-based contrast enhancement of mammograms," *IEEE Trans. Med. Imag.,* vol. 11, no. 3, pp. 392–406, 1992.

[3] W. Qian, L. P. Clarke, M. Kallergi, and R. A. Clark, "Tree structured nonlinear filters in digital mammography," *IEEE Trans. Med. Imag.,* vol. 13, no. 1, pp. 25–36, 1994.

[4] J. Lu, D. M. Healy, Jr., and J. B. Weaver, "Contrast enhancement of medical images using multiscale edge representation," *Opt. Eng.,* vol. 33, no. 7, pp. 2151–2161, 1994.

[5] R. M. Nishikawa, C. J. Vyborny, M. L. Giger, and K. Doi, "Analysis of false-positive clusters identified by a mammographic computer-aided detection scheme," in *Proc. SPIE* 2167, *Image Processing,* 1994, pp. 773–777.

[6] A. F. Laine, S. Schuler, J. Fan, and W. Huda, "Mammographic feature enhancement by multiscale analysis," *IEEE Trans. Med. Imag.,* vol. 13, no. 4, pp. 725–740, 1994.

[7] W. Qian, L. P. Clarke, B. Zheng, M. Kallergi, and R. A. Clark, "Computer assisted diagnosis for digital mammography," *IEEE Eng. Med. Biol. Mag.,* vol. 14, no. 5, pp. 561–569, 1995.

[8] N. Petrick, H.-P. Chan, B. Sahiner, and D. Wei, "An adaptive density-weighted contrast enhancement filter for mammographic breast mass detection," *IEEE Trans. Med. Imag.,* vol. 15, no. 1, pp. 59–67, 1996.

[9] J. Fan and A. Laine, "Multiscale contrast enhancement and denoising in digital radiographs," in *Wavelets in Medicine and Biology,* A. Aldroubi and M. Unser, Eds., Boca Raton, Fla.: CRC, 1996, pp. 163, 189.

[10] N. Karssemeijer, "Recognition of clustered microcalcifications using a random field model," in *Biomedical*

*Image Processing and Biomedical Visualization*, in *Proc. SPIE* 1905, 1993, R. S. Acharya and D. B. Goldgof, Eds., pp. 776–786.

[11] J. Dengler, S. Behrens, and J. F. Desaga, "Segmentation of microcalcifications in mammograms," *IEEE Trans. Med. Imag.*, vol. 12, no. 4, pp. 634–642, 1993.

[12] L. Valatx. I. E. Magnin, and A. Brémond, "Automatic microcalcification and opacities detection in digitized mammograms using a multiscale approach," in *Digital Mammography*, A. G. Gale, S. M. Astley, D. R. Dance, and A. Y. Cairns, Eds., Amsterdam, the Netherlands: Elsevier Science B. V., 1994, pp. 51–57.

[13] C. E. Priebe, J. L. Solka, R. A. Lorey, G. W. Rogers, W. L. Poston, M. Kallergi, W. Qian, L. P. Clarke, and R. A. Clark, "The application of fractal analysis to mammographic tissue classification," *Cancer Lett.*, vol. 77, pp. 183–189, 194.

[14] C. E. Priebe, R. A. Lorey, D. J. Marchette, J. L. Solka, and G. W. Rogers, "Nonparametric spatio-temporal change point analysis for early detection in mammography," in *Digital Mammography*, A. G. Gale, S. M. Astley, D. R. Dance, and A. Y. Cairns, Eds., Amsterdam, the Netherlands: Elsevier Science B. V., 1994, pp. 111–120.

[15] D. S. Brettle, G. McLeod, R. J. Oddy, G. J. S. Parkin, and A. R. Cowen, "Automatic microcalcification localization using matched Fourier filtering," in *Digital Mammography*, A. G. Gale, S. M. Astley, D. R. Dance, and A. Y. Cairns, Eds., Amsterdam, the Netherlands: Elsevier Science B. V., 1994, pp. 21–30.

[16] J. Parker, D. R. Dance, and J. Suckling, "The hysteresis technique for detection of calcifications in digital mammograms," in *Digital Mammography*, A. G. Gale, S. M. Astley, D. R. Dance, and A. Y. Cairns, Eds., Amsterdam, the Netherlands: Elsevier Science B. V., 1994, pp.41–50.

[17] W. Qian, L. P. Clarke, H.-D. Li, R. Clark, and M. L. Silbiger, "Digital mammography: M-channel quadrature mirror filters (QMF's) for microcalcification extraction," *Comput. Med. Imag. Graphics*, vol. 18, no. 5, pp. 301–314, 1994.

[18] H.-D. Li, M. Kallergi, L. P. Clarke, V. K. Jain, and R. A. Clark, "Markov random field for tumor detection in digital mammography," *IEEE Trans. Med. Imag.*, vol. 14, no. 3, pp. 565–576, 1995.

[19] W. Qian, M. Kallergi, L. P. Clarke, H.-D. Li, P. Venugopal, D. Song, and R. A. Clark, "Tree structured wavelet segmentation of microcalcifications in digital mammography," *Med. Phys.*, vol. 22, no. 8, pp. 1247–1254, 1995.

[20] W. Qian, M. Kallergi, L. P. Clarke, H.-D. Li, P. Venugopal, D. Song, and R. A. Clark, "Tree structured wavelet transform segmentation of microcalcifications in digital mammography," *Med. Phys.*, vol. 22, no. 8, pp. 1247–1254, 1995.

[21] F. Lefebvre, H. Benali, R. Gilles, E. Kahn, and R. Di Paola, "A fractal approach to the segmentation of microcalcifications in digital mmograms," *Med. Phys.*, vol. 22, no. 4, pp. 381–390, 1995.

[22] H.-P. Chan, S.-C. B. Lo., B. Sahiner, K. L. Lam, and M. A. Helvie, "Computer-aided detection of mammographic microcalcifications: Pattern recognition with an artificial neural network," *Med. Phys.*, vol. 22, no. 10, pp. 1555–1567, 1995.

[23] R. N. Strickland and H. I. Hann, "Wavelet transforms for detecting microcalcifications in mammograms," *IEEE Trans. Med. Imag.*, vol. 15, no. 2, pp. 218–229, 1996.

[24] W. Qian and L. P. Clarke, "Wavelet-based neural network with fuzzy-logic adaptivity for nuclear image restoration," *Proc. IEEE*, vol. 84, no. 10, pp. 1458–1473, 1996.

[25] B. Zheng, W. Qian, and L. P. Clarke, "Digital mammography: Mixed feature neural network with spectral entropy decision for detection of microcalcifications," *IEEE Trans. Med. Imag.*, vol. 15, no. 5, pp. 589–597, 1996.

[26] R. A. DeVore, B. Lucier, and Z. Yang, "Feature extraction in digital mammography," in *Wavelets in Medicine and Biology*, A. Aldroubi and M. Unser, Eds., Boca Raton, Fla.: CRC, 1996, pp. 145–161.

[27] N. Karssemeijer, "Adaptive noise equalization and recognition of microcalcification clusters in mammograms," *Int. J. Pattern Recog. Artificial Intell.*, vol. 7, no. 6, pp. 1357–1376, 1993.

[28] S. G. Mallat, "A theory for multiresolution signal decomposition: The wavelet representation," *IEEE Trans. Pattern Anal. Machine Intell.*, vol. 11, no. 7, pp. 674–693, 1989.

[29] M. Antonini, M. Barlaud, P. Mathieu, and I. Daubechies, "Image coding using wavelet transform," *IEEE Trans. Image Processing*, vol. 1, no. 2, pp. 205–220, 1992.

[30] K. C. Chou, S. Golden, and A. S. Willsky, "Modeling and estimation of multiscale stochastic processes," in *Proc. IEEE ICASSP '91*, 1991, vol. 3-D, pp. 1709–1712.

[31] V. V. Digalakis and K. C. Chou, "Maximum likelihood identification of multiscale stochastic models using the wavelet transform and the EM algorithm," in *Proc. IEEE ICASSP '93*, 1993, vol. IV, pp. 93–96.

[32] J.-L. Chen and A. Kundu, "Rotation and gray scale transform invariant texture identification using wavelet decomposition and hidden Markov model," *IEEE Trans. Pattern Anal. Machine Intell.*, vol. 16, no. 2, pp. 208–14, 1994.

[33] G. K. Froehlich, J. F. Walkup and T. F. Krile, "Estimation in signal-dependent film-grain noise," *Appl. Opt.*, vol. 20, no. 20, pp. 3619–3626.

[34] R. Kasturi, T. F. Krile, and J. F. Walkup, "Image recovery from signal-dependent noise," *Opt. Lett.*, vol. 8, pp. 401–403, 1983.

[35] G. T. Barnes, "Radiographic mottle: A comprehensive theory," *Med. Phys.*, vol. 9, no. 5, pp. 656–667, 1982.

[36] J. S. Whiting, M. P. Eckstein, C. A. Morioka, and N. L. Eigler, "Effect of additive noise, signal contrast and feature motion on visual detection in structured noise," in *Proc. SPIE* 2712, *Image Perception*, H. L. Kundel, Ed., 1996, pp. 26–38.

[37] M. Kallergi, K. Woods, L. P. Clarke, W. Qian, and R. A. Clark, "Image segmentation in digital mammography: Comparison of local thresholding and region growing algorithms," *Comput. Med. Imag. Graphics*, vol. 16, no. 5, pp. 323–331, 1992.

[38] L. Andersson, N. Hall, B. Jawerth, and G. Peters, "Wavelets on closed subsets of the real line," in *Recent Advances in Wavelet Analysis*, L. L. Schumaker and G. Webb, Eds. Boston, Mass.: Academic, 1994, pp. 1–61.

[39] I. Daubechies, *Ten Lectures on Wavelets*. Philadelphia, Pa.: Society for Industrial and Applied Mathematics, 1992.

[40] N. L. Johnson and S. Kotz, *Continuous Univariant Distributions*, $2^{nd}$ ed. New York: Wiley, 1995, vol. 2.

[41] D. I. Barnea and H. F. Silverman, "A class of algorithms for fast digital registration," *IEEE Trans. Comput.*, vol. C-21, no. 2, pp. 179–186, 1972.

[42] W. Mendenhall and R. L. Scheaffer, *Mathematical Statistics with Applications.* North Scituate, Mass.: Duxbury, 1973.

[43] S. Hajnal, P. Taylor, M.-H. Dilhuydy, and B. Barreau, "Classifying mammograms by density: Sorting for screening," in *State of the Art in Digital Mammographic Image Analysis,* K. W. Bowyer and S. Asstley, Eds. Singapore: World Scientific, 1994, pp. 64–81.

[44] P. F. Judy, "Detection of clusters of simulated calcifications in lumpy noise backgrounds," in *Proc. SPIE* 2712, *Image Perception,* H. L. Kundel, Ed., 1996, pp. 39–46.

[45] N. L. Johnson, S. Kotz, and N. Balakrishnan, *Continuous Univariant Distributions,* $2^{nd}$ ed. New York: Wiley, 1994, vol. I.

[46] G. Casella and R. L. Berger, *Statistical Inference.* Belmont, Calif.: Duxbury, 1990.

[47] J. J. Heine, S. R. Deans, D. K. Cullers, R. Stauduahar, and L. P. Clarke, "Multiresolution statistical analysis of high resolution digital mammograms," *IEEE Trans. Med. Imag.* 16, 503–15, 1997.

[48] J. J. Heine, S. R. Deans, and L. P. Clarke, "Multiresolution probability analysis of gray scaled images," *JOSA A,* in press.

[49] J. J. Heine, S. R. Deans, and L. P. Clarke, "Multiresolution probability analysis of random fields," *JOSA A,* submitted.

[50] E. W. Frees, "Estimating densities of functions of observations," *J. Am. Stat. Assoc.* 89, 517–25, 1994.

[51] J. J. Heine, M. Kallergi, S. M. Chetelat, and L. P. Clarke, "Multiresolution Wavelet Approach for Separating the Breast Region from the Background in High Resolution Digital Mammography," 4th Intl. Workshop on Digital Mammography, 7–10 June 1998, The Netherlands, submitted.

What is claimed is:

1. A method for analyzing a medical image to determine whether the image is classifiable as normal, the method comprising the steps of:

applying a wavelet expansion to a digital representation of a raw image, the raw image comprising an array of sectors, each sector having an intensity level, to obtain a plurality of expansion images of varying resolution;

selecting at least one expansion image having a resolution commensurate with a desired predetermined detection resolution range;

dividing each expansion image into a plurality of regions, each region comprising at least one sector; and creating an output image comprising a combination of all regions for each selected expansion image, each region having a first value when the region intensity level is above a predetermined threshold level and a second value when the region intensity level is below the threshold level, for localizing a potential abnormality within the image;

wherein an absence of a predetermined number of regions having a first value intensity level is indicative of the image being classifiable as normal.

2. The method recited in claim 1, further comprising the steps, prior to the output image creating step, of:

applying a wavelet expansion to a digital representation of a raw control image comprising an array of sectors, each sector having an intensity level, to obtain a plurality of expansion images of varying resolution;

selecting at least one expansion image having a resolution commensurate with a desired predetermined detection resolution range;

determining a functional form of a probability distribution function for each selected expansion image;

determining an optimal statistical normal image region test for each selected expansion image;

establishing the threshold level for the probability distribution function from the optimal statistical normal image region test for each selected expansion image.

3. The method recited in claim 2, wherein the expansion-image selecting step comprises empirically selecting two adjacent expansion images.

4. The method recited in claim 3, wherein the test-determining step comprises forming a search window having a predetermined resolution size for each selected expansion image, and wherein the output image creating step comprises combining the selected two adjacent expansion images and applying a binary mask having the predetermined resolution size to the combined expansion space images.

5. The method recited in claim 2, wherein the optimal statistical normal image region test determining step comprises using a maximum likelihood technique.

6. The method recited in claim 2, wherein the threshold level establishing step comprises applying an iterative procedure to determine a set of operating parameters for each selected expansion image.

7. The method recited in claim 2, wherein the probability density function comprises one of a family of distributions having the form:

$$P(\omega) = \frac{k^{2N}}{(k^2 + \omega^2)^N}.$$

8. The method recited in claim 2, wherein the test determining step comprises assuming a parametric form of a test statistic distribution.

9. The method recited in claim 1, wherein the test determining step comprises assuming a nonparametric form of a test statistic distribution and using a kernel density estimation method.

10. The method recited in claim 1, wherein the raw image comprises a film image, and further comprising the step, prior to the wavelet-expansion application step, of digitizing the film image.

11. The method recited in claim 1, wherein the wavelet-expansion application step comprises performing a separable kernel two-dimensional pyramid downsampling/upsampling scheme.

12. The method recited in claim 11, wherein each expansion image comprises a difference in information between a first image having a first resolution and a second image having a resolution one-half that of the first image.

13. The method recited in claim 1, wherein the expansion-image selecting step comprises empirically selecting a number of expansion images commensurate with an initial raw image resolution.

14. The method recited in claim 1, wherein the expansion image selecting step comprises selecting a plurality of expansion images, each expansion image having a resolution commensurate with a size range of an abnormality desired to be detected.

15. The method recited in claim 1, further comprising the step of defining a tissue boundary for analysis.

16. The method recited in claim 15, wherein the medical image comprises a digitized mammogram, and wherein the tissue boundary defining step comprises excising a breast boundary on the digitized mammogram.

17. The method recited in claim 16, wherein the breast boundary excising step comprises the steps of:
defining an off-tissue region comprising a generally random noise field and a plurality of anomalous regions;
defining a tissue region comprising signal information;
separating out the random noise field;
determining a remaining contiguous region containing information; and
setting the image region outside the remaining contiguous region to zero.

18. The method recited in claim 1, further comprising the steps of:
defining a cluster area having a size greater than a size of the region;
setting a number of regions within each cluster area in the image having the first value to a first variable;
comparing the first variable with a predetermined second variable;
if the first variable is greater than or equal to the second variable, flagging the cluster area as potentially suspicious for the presence of an abnormality; and
if the first variable is less than the second variable, classifying the cluster area to be normal.

19. The method recited in claim 1, wherein the medical image comprises a digitized mammogram, and the expansion image selecting step comprises selecting two adjacent expansion images having resolution less than 0.5 mm.

20. The method recited in claim 19, wherein the two selected adjacent expansion images further have resolution greater than 0.1 mm.

21. An apparatus for analyzing a medical image to determine whether an abnormality is present comprising:
means for applying a wavelet expansion to a digital representation of a raw image, the raw image comprising an array of sectors, each sector having an intensity level, to obtain a plurality of expansion images of varying resolution;
means for selecting at least one expansion image having a resolution commensurate with a desired predetermined detection resolution range;
means for dividing each expansion image into a plurality of regions, each region comprising at least one sector; and
means for creating an output image comprising a combination of all regions for each selected expansion image, each region having a first value when the region intensity level is above a predetermined threshold level and a second value when the region intensity level is below the threshold level, for localizing a potential abnormality within the image.

22. The apparatus recited in claim 21, further comprising:
means for applying a wavelet expansion to a digital representation of a raw control image, the raw control image comprising an array of sectors, each sector having an intensity level, to obtain a plurality of expansion images of varying resolution;
means for selecting at least one expansion image having a resolution commensurate with a desired predetermined detection resolution range;
means for determining a functional form of a probability distribution function for each selected expansion image;
means for determining an optimal statistical normal image region test for each selected expansion image; and
means for establishing the threshold level for the probability distribution function from the optimal statistical normal image region test for each selected expansion image.

23. The apparatus recited in claim 21, wherein the raw image comprises a film image, and further comprising means for digitizing the raw image.

24. The apparatus recited in claim 21, wherein the wavelet expansion applying means comprises software means.

25. The apparatus recited in claim 21, wherein the output image creating means comprises software means resident within a processor and a screen in electronic communication with the processor for visualizing the output image.

* * * * *